US012579624B2

(12) United States Patent
Park et al.

(10) Patent No.: US 12,579,624 B2
(45) Date of Patent: Mar. 17, 2026

(54) DISPLAY DEVICE AND OPERATING DRIVING THEREOF

(71) Applicant: LG ELECTRONICS INC., Seoul (KR)

(72) Inventors: Jong Ho Park, Seoul (KR); Jung Wook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 18/233,814

(22) Filed: Aug. 14, 2023

(65) Prior Publication Data

US 2024/0362761 A1 Oct. 31, 2024

(30) Foreign Application Priority Data

Apr. 28, 2023 (KR) ........................ 10-2023-0055855

(51) Int. Cl.
| | |
|---|---|
| *G06T 5/94* | (2024.01) |
| *G06T 5/20* | (2006.01) |
| *G06T 5/40* | (2006.01) |
| *G06T 5/70* | (2024.01) |
| *G06T 5/73* | (2024.01) |
| *G06T 5/92* | (2024.01) |

(52) U.S. Cl.
CPC .................. *G06T 5/94* (2024.01); *G06T 5/20* (2013.01); *G06T 5/40* (2013.01); *G06T 5/70* (2024.01); *G06T 5/73* (2024.01); *G06T 5/92* (2024.01); *G06T 2207/20208* (2013.01)

(58) Field of Classification Search
CPC .... G06T 5/94; G06T 5/40; G06T 5/73; G06T 5/70; G06T 5/20; G06T 5/92; G06T 2207/20208; G09G 2320/066; G09G 3/2007; H04N 5/57
See application file for complete search history.

(56) References Cited

U.S. PATENT DOCUMENTS 11,532,289 B2 12/2022 Lee et al.
2014/0086486 A1* 3/2014 Pillman ..................... G06T 5/73
382/173

(Continued)

FOREIGN PATENT DOCUMENTS

KR 1020100033737 3/2010
KR 1020200032584 3/2020

OTHER PUBLICATIONS

Korean Intellectual Property Office Application No. 10-2023-0055855, Office Action dated Feb. 11, 2025, 5 pages.

*Primary Examiner* — Phi Hoang
(74) *Attorney, Agent, or Firm* — LEE, HONG, DEGERMAN, KANG & WAIMEY

(57) ABSTRACT

A display device according to an embodiment may include a display and a controller configured to apply a global contrast curve that adjusts a luminance of an entire region of an input image, generate a plurality of local contrast curves corresponding to each of a plurality of local regions based on a local information of each of the plurality of local regions included in the entire region, apply each local contrast curve to each local area, and adjust one or more of a noise processing intensity or a sharpness intensity of a local output image to which the local contrast curve is applied based on each local information.

12 Claims, 19 Drawing Sheets

(56)  References Cited

U.S. PATENT DOCUMENTS

| | | | |
|---|---|---|---|
| 2016/0127665 A1* | 5/2016 | Cho | G06T 5/70 |
| | | | 348/241 |
| 2019/0279342 A1* | 9/2019 | Nanu | H04N 23/67 |
| 2020/0177786 A1 | 6/2020 | Guerin et al. | |
| 2020/0184613 A1* | 6/2020 | Li | G06T 5/40 |
| 2021/0272251 A1 | 9/2021 | Unger et al. | |
| 2023/0066869 A1* | 3/2023 | Kim | G06T 5/90 |
| 2024/0005462 A1* | 1/2024 | Hwang | H04N 23/741 |
| 2024/0087275 A1* | 3/2024 | Taïeb | G06V 10/60 |

* cited by examiner

START

GENERATE BASE MAPPING CURVE FOR ENTIRE REGION ──S501

ANALYZE INFORMAIOTN FOR EACH LOCAL REGION ──S503

APPLY LOCAL MAPPLING CURVE TO EACH LOCAL REGION ──S505

END

R2           R1         R3 apply a global contrast curve to the original image —S1401 apply the local contrast curve to each of a plurality of local regions —S1403 acquire the intensity of each local contrast curve —S1405 adjust the intensity of noise processing or sharpness of the local output image based on the intensity of the obtained local contrast curve —S1407

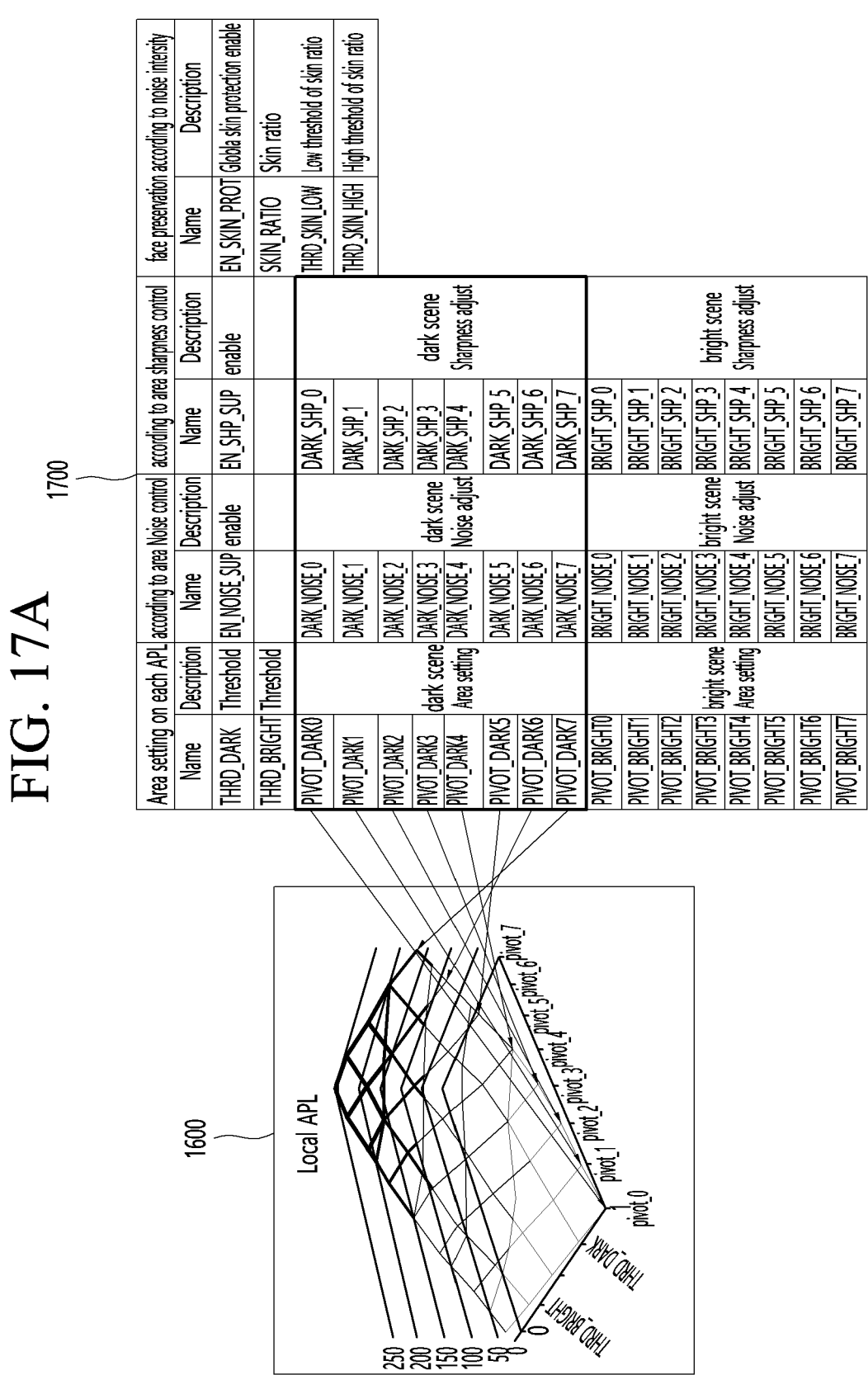

1700

| Area setting on each APL | | according to area Noise control | | according to area sharpness control | | face preservation according to noise intensity | |
|---|---|---|---|---|---|---|---|
| Name | Description | Name | Description | Name | Description | Name | Description |
| THRD_DARK | Threshold | EN_NOISE_SUP | enable | EN_SHP_SUP | enable | EN_SKIN_PROT | Globla skin protection enable |
| THRD_BRIGHT | Threshold | | | | | SKIN_RATIO | Skin ratio |
| PIVOT_DARK0 | dark scene Area setting | DARK_NOISE_0 | dark scene Noise adjust | DARK_SHP_0 | dark scene Sharpness adjust | THRD_SKIN_LOW | Low threshold of skin ratio |
| PIVOT_DARK1 | | DARK_NOISE_1 | | DARK_SHP_1 | | THRD_SKIN_HIGH | High threshold of skin ratio |
| PIVOT_DARK2 | | DARK_NOISE_2 | | DARK_SHP_2 | | | |
| PIVOT_DARK3 | | DARK_NOISE_3 | | DARK_SHP_3 | | | |
| PIVOT_DARK4 | | DARK_NOISE_4 | | DARK_SHP_4 | | | |
| PIVOT_DARK5 | | DARK_NOISE_5 | | DARK_SHP_5 | | | |
| PIVOT_DARK6 | | DARK_NOISE_6 | | DARK_SHP_6 | | | |
| PIVOT_DARK7 | | DARK_NOISE_7 | | DARK_SHP_7 | | | |
| PIVOT_BRIGHT0 | bright scene Area setting | BRIGHT_NOISE_0 | bright scene Noise adjust | BRIGHT_SHP_0 | bright scene Sharpness adjust | | |
| PIVOT_BRIGHT1 | | BRIGHT_NOISE_1 | | BRIGHT_SHP_1 | | | |
| PIVOT_BRIGHT2 | | BRIGHT_NOISE_2 | | BRIGHT_SHP_2 | | | |
| PIVOT_BRIGHT3 | | BRIGHT_NOISE_3 | | BRIGHT_SHP_3 | | | |
| PIVOT_BRIGHT4 | | BRIGHT_NOISE_4 | | BRIGHT_SHP_4 | | | |
| PIVOT_BRIGHT5 | | BRIGHT_NOISE_5 | | BRIGHT_SHP_5 | | | |
| PIVOT_BRIGHT6 | | BRIGHT_NOISE_6 | | BRIGHT_SHP_6 | | | |
| PIVOT_BRIGHT7 | | BRIGHT_NOISE_7 | | BRIGHT_SHP_7 | | | |

1600

Local APL pivot_0, pivot_1, pivot_2, pivot_3, pivot_4, pivot_5, pivot_6, pivot_7

THRD_DARK, THRD_BRIGHT

| Area setting on each APL | | according to area Noise control | | | according to area sharpness control | | | face preservation according to noise intensity | |
|---|---|---|---|---|---|---|---|---|---|
| Name | Description | Name | Description | | Name | Description | | Name | Description |
| THRD_DARK | Threshold | EN_NOISE_SUP | enable | | EN_SHP_SUP | enable | | EN_SKIN_PROT | Globla skin protection enable |
| THRD_BRIGHT | Threshold | | | | | | | SKIN_RATIO | Skin ratio |
| PIVOT_DARK0 | | DARK_NOISE_0 | | | DARK_SHP_0 | | | THRD_SKIN_LOW | Low threshold of skin ratio |
| PIVOT_DARK1 | | DARK_NOISE_1 | | | DARK_SHP_1 | | | THRD_SKIN_HIGH | High threshold of skin ratio |
| PIVOT_DARK2 | | DARK_NOISE_2 | | | DARK_SHP_2 | | | | |
| PIVOT_DARK3 | dark scene Area setting | DARK_NOISE_3 | dark scene Noise adjust | | DARK_SHP_3 | dark scene Sharpness adjust | | | |
| PIVOT_DARK4 | | DARK_NOISE_4 | | | DARK_SHP_4 | | | | |
| PIVOT_DARK5 | | DARK_NOISE_5 | | | DARK_SHP_5 | | | | |
| PIVOT_DARK6 | | DARK_NOISE_6 | | | DARK_SHP_6 | | | | |
| PIVOT_DARK7 | | DARK_NOISE_7 | | | DARK_SHP_7 | | | | |
| PIVOT_BRIGHT0 | | BRIGHT_NOISE_0 | | | BRIGHT_SHP_0 | | | | |
| PIVOT_BRIGHT1 | | BRIGHT_NOISE_1 | | | BRIGHT_SHP_1 | | | | |
| PIVOT_BRIGHT2 | | BRIGHT_NOISE_2 | | | BRIGHT_SHP_2 | | | | |
| PIVOT_BRIGHT3 | bright scene Area setting | BRIGHT_NOISE_3 | bright scene Noise adjust | | BRIGHT_SHP_3 | bright scene Sharpness adjust | | | |
| PIVOT_BRIGHT4 | | BRIGHT_NOISE_4 | | | BRIGHT_SHP_4 | | | | |
| PIVOT_BRIGHT5 | | BRIGHT_NOISE_5 | | | BRIGHT_SHP_5 | | | | |
| PIVOT_BRIGHT6 | | BRIGHT_NOISE_6 | | | BRIGHT_SHP_6 | | | | |
| PIVOT_BRIGHT7 | | BRIGHT_NOISE_7 | | | BRIGHT_SHP_7 | | | | |

1600

Local APL pivot_7
pivot_6
pivot_5
pivot_4
pivot_3
pivot_2
pivot_1
pivot_0

250
200
150
100
50
0

THRD_DARK
THRD_BRIGHT local information                    local information

| noise processing unit | → | a sharpness adjusting unit | → | local contrast controlling unit |

1801                    1803                    1805

DISPLAY DEVICE AND OPERATING DRIVING THEREOF

CROSS-REFERENCE TO RELATED APPLICATIONS

Pursuant to 35 U.S.C. § 119(a), this application claims the benefit of earlier filing date and right of priority to Korean Patent Application No. 10-2023-0055855, filed on Apr. 28, 2023, the contents of which are all hereby incorporated by reference herein in their entirety.

BACKGROUND OF THE INVENTION

1. Field of the Invention

The present disclosure relates to a display device and a driving method thereof.

2. Discussion of the Related Art

A digital image is generally composed of three channels of RGB, and in general, a standard dynamic range (SDR) image can express brightness in the range of 0-255 (8 bits) for each channel. However, in SDR images, the range of brightness that can be expressed in each channel is narrow, so dark parts are not properly expressed or bright parts are often not properly expressed. For example, in the case of an image in which a difference in brightness between a dark part and a bright part is significant, such as a photograph taken in backlight, the contrast balance is biased to one side. Accordingly, a large difference may occur between a scene viewed with the naked eye and an SDR image obtained by photographing the scene. In contrast to these SDR images, images expressed in 16 bits or 32 bits for each channel are called high dynamic range (HDR) images. The HDR images have the advantage of being able to be expressed more realistically since the HDR images can be expressed in a wider brightness.

However, since a general display device cannot express 16-bit or 32-bit gradation, a 16-bit or 32-bit HDR image needs to be converted into a digital image having a limited dynamic range. Tone mapping is used in the process of converting an HDR image into an SDR image or LDR (Low Dynamic Range) image and may refer to a technique of compressing a brightness of an HDR image to a brightness of an SDR image or an LDR image while improving a contrast ratio.

SUMMARY OF THE INVENTION

A problem to be solved of the present disclosure is to suppress digital noise generated when tone mapping is performed by applying a local contrast curve to a local area to provide clear and sharp image quality.

A problem to be solved of the present disclosure is to individually control the noise or sharpness of each local area based on the local information of the local area.

A display device according to an embodiment of the present disclosure may include a display and a controller configured to apply a global contrast curve that adjusts a luminance of an entire region of an input image, generate a plurality of local contrast curves corresponding to each of a plurality of local regions based on a local information of each of the plurality of local regions included in the entire region, apply each local contrast curve to each local area, and adjust one or more of a noise processing intensity or a sharpness intensity of a local output image to which the local contrast curve is applied based on each local information.

A method of driving a display device according to an embodiment of the present disclosure includes applying a global contrast curve that adjusts luminance of an entire region of an input image, generating a plurality of local contrast curves corresponding to each of the plurality of local areas based on local information of each of the plurality of local areas included in the entire area, applying each local contrast curve to each local area and adjusting at least one of noise processing intensity and sharpness intensity of the local output image to which the local contrast curve is applied based on each local information.

According to an embodiment of the present disclosure, when tone mapping is performed by applying a local contrast curve to a local area, digital noise generated can be suppressed and clear and clear picture quality can be provided.

Accordingly, the user's viewing immersion can be increased.

BRIEF DESCRIPTION OF THE DRAWINGS

FIG. 16 is a diagram illustrating a pivot table according to local APL.

FIG. 17A is a diagram illustrating a look-up table for classifying some of the entire regions of a dark image as bright regions according to APL and adjusting noise or sharpness of each classified bright region.

FIG. 17B is a diagram illustrating a look-up table for classifying some of the entire areas of a bright image as dark areas according to APL and adjusting noise or sharpness of each classified dark area.

DETAILED DESCRIPTION OF THE PREFERRED EMBODIMENTS

Hereinafter, embodiments relating to the present disclosure will be described in detail with reference to the accompanying drawings. The suffixes "interface" for components used in the description below are assigned or mixed in consideration of easiness in writing the specification and do not have distinctive meanings or roles by themselves.

While ordinal numbers comprising 'first', 'second', etc. may be used to describe various components, they are not intended to limit the components. These expressions may be used to distinguish one component from another component.

Hereinafter, although a description will be given on the assumption that a display device is a smart TV supporting a broadcast reception function, the display device may comprise a smartphone, etc. That is, the display device according to an embodiment of the present disclosure does not necessarily comprise the components shown in FIG. 1.

Figure 1:
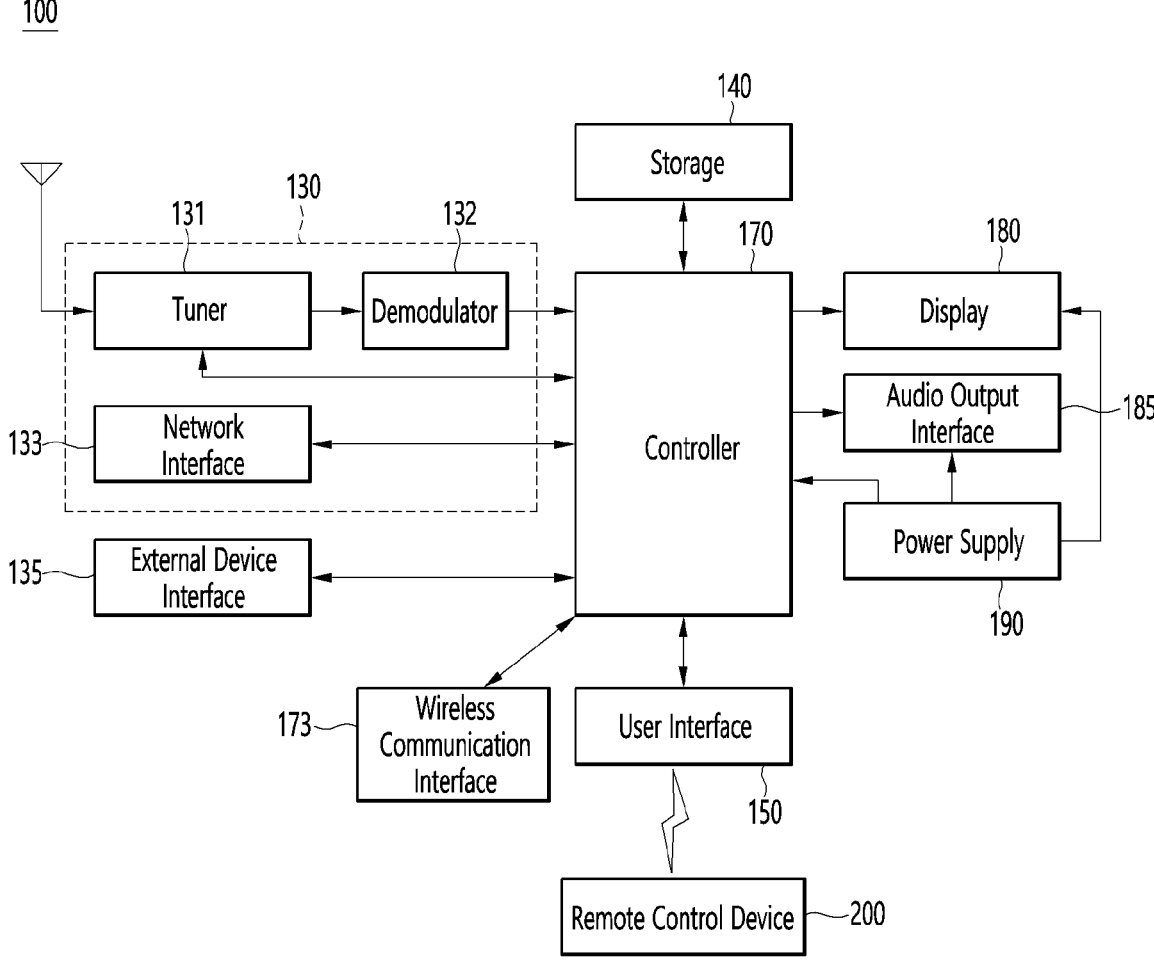
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can comprise a broadcast reception module 130, an external device interface 135, a storage 140, a user input interface 150, a controller 170, a wireless communication interface 173, a display 180, an audio output interface 185, and a power supply 190.

The broadcast reception module 130 can comprise a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network comprising internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can comprise a plurality of external input terminals. The plurality of external input terminals can comprise an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks comprising the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without comprising the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device comprising the display 180 and the audio output interface 185.

Figure 2:
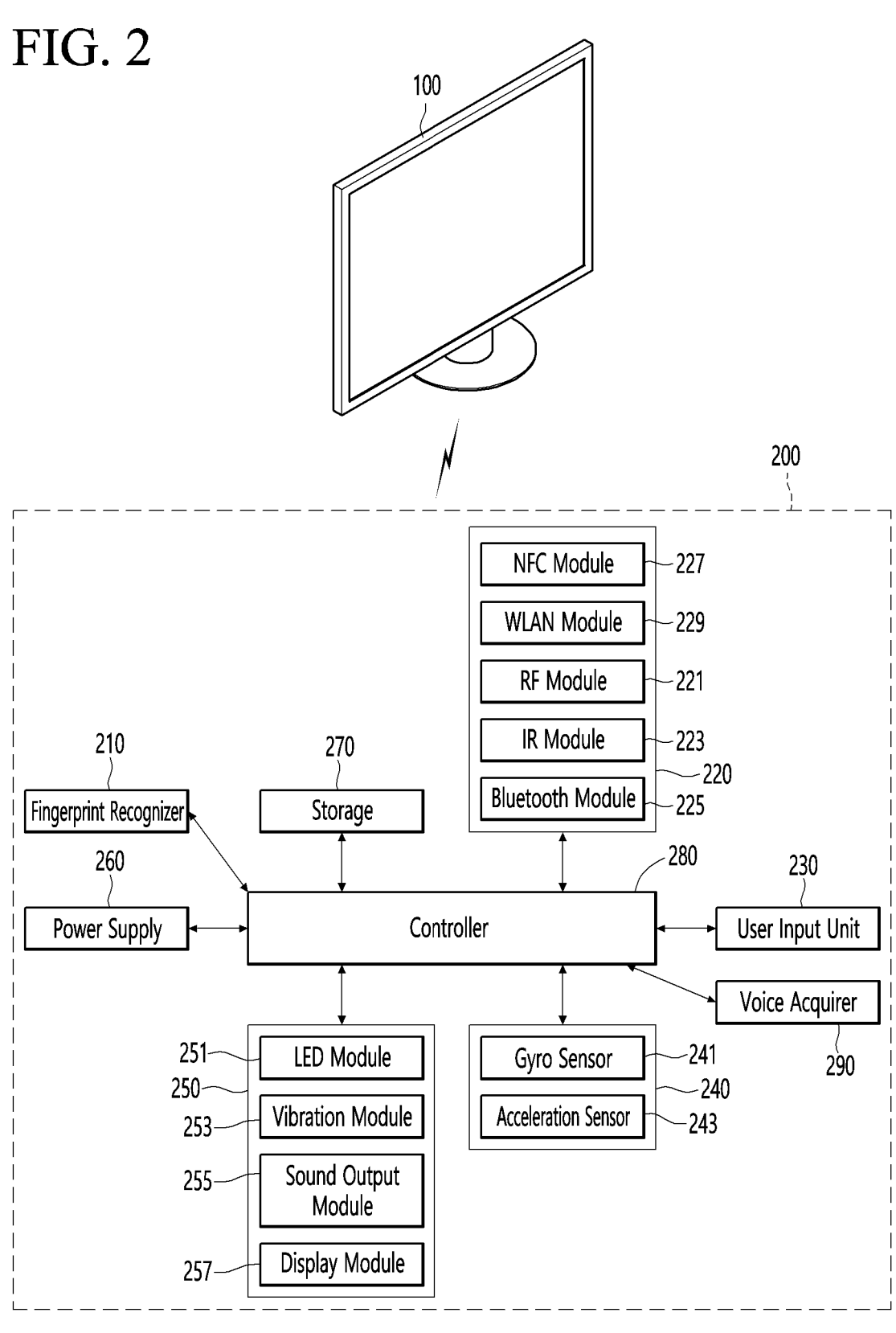
FIG. 2 is a block diagram illustrating a remote control device according to an embodiment of the present disclosure.
Figure 3:
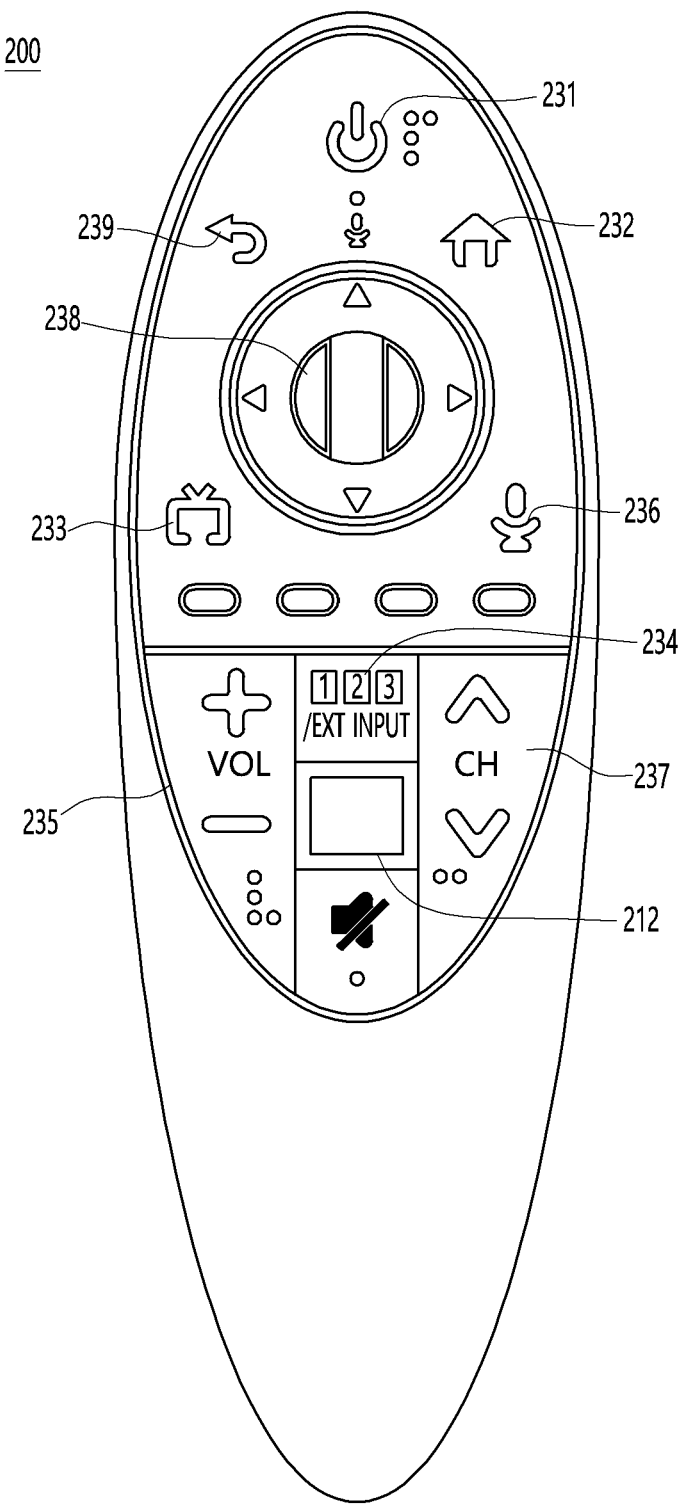
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can comprise a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can comprise an RF module 221 for transmitting/receiving signals to/from the display device 100 according to the RF communication standards and an IR module 223 for transmitting/receiving signals to/from the display device 100 according to the IR communication standards. Additionally, the remote control device 200 can comprise a Bluetooth module 225 for transmitting/receiving signals to/from the display device 100 according to the Bluetooth communication standards. Additionally, the remote control device 200 can comprise an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 comprises a hard key button, a user can input a command relating to the display device 100 to the remote control device 200 through the push operation of the hard key button. This will be described with reference to FIG. 3.

Referring to FIG. 3, the remote control device 200 can comprise a plurality of buttons. The plurality of buttons can comprise a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 comprises a touch screen, a user can touch a soft key of the touch screen to input a command relating to the display device 100 to the remote control device 200. Additionally, the user input interface 230 can comprise various kinds of input means manipulated by a user, for example, a scroll key and a jog key, and this embodiment does not limit the scope of the present disclosure.

The sensor 240 can comprise a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further comprise a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can comprise an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can comprise at least one microphone 291 and obtain voice through the microphone 291.

Figure 4:
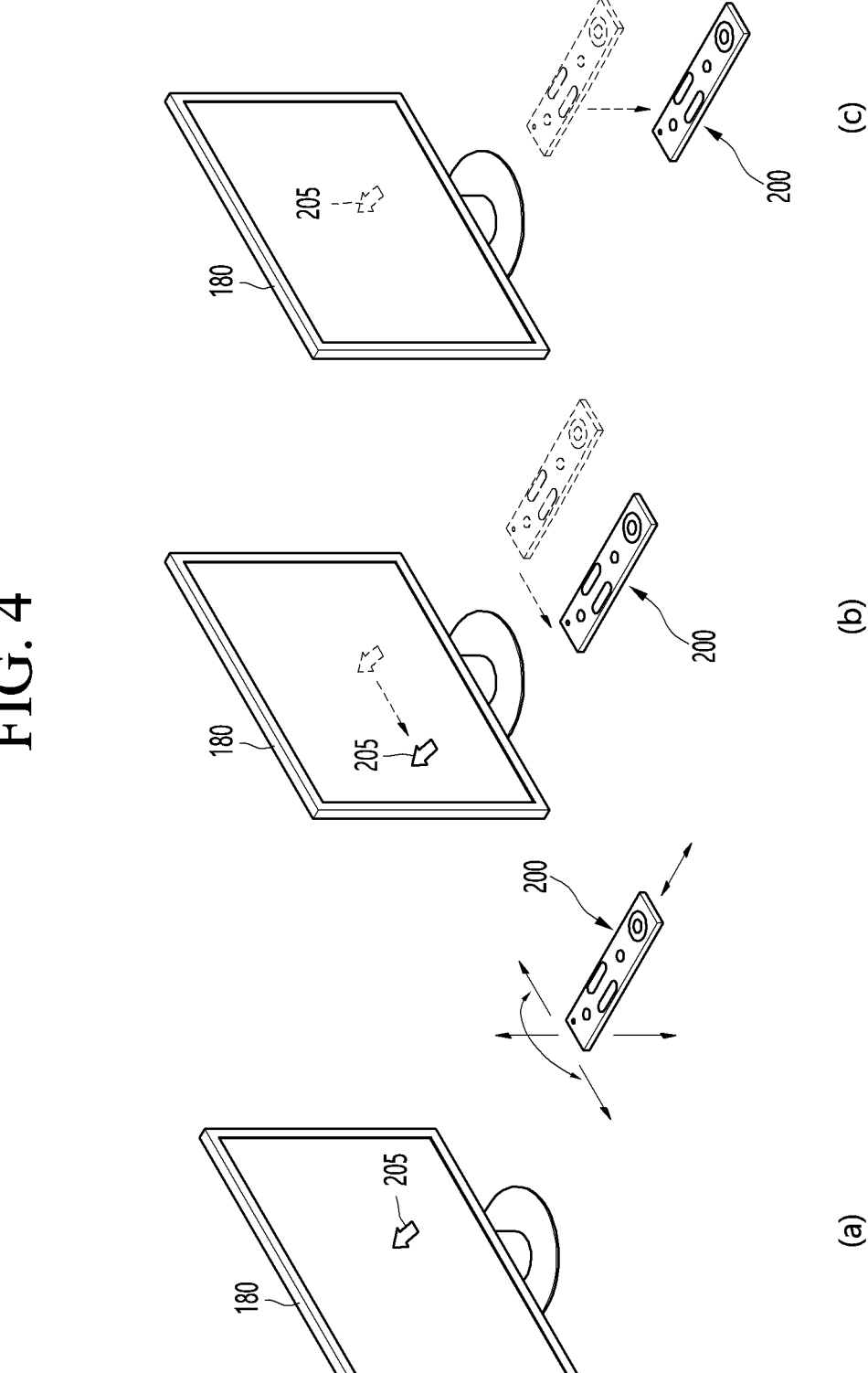
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept comprises a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display device 100 according to an embodiment may comprise a controller 170 that performs tone mapping for adjusting the luminance of input image data.

The display device 100 may comprise the display 180 that displays an image according to output image data whose luminance is adjusted by the tone mapping performed by the controller 170.

The controller 170 may generate a base mapping curve for the entire region from the input image data. The controller 170 may extract information for each local region of the entire region, and generate a local mapping curve in which the information for each local region is reflected for each local region. The controller 170 may perform tone mapping for each local region using the local mapping curve to which the information for each local region is reflected. An image according to the output image data in which local mapping is performed for each local region by the controller 170 may be displayed on the display 180.

The base mapping curve may comprise a dynamic contract curve for the entire region. The local mapping curve may comprise a local contrast curve for a corresponding local region.

The controller 170 may extract information for each local region of the entire region, and generate an adaptive local contrast curve for each local region from the mapping curve of the entire region based on the extracted information for each local region. The controller 170 may perform tone mapping for each local region using the adaptive local contrast curve generated for each local region.

The display 180 may be provided as a flat display unit. The display 180 may be provided as a curved display unit having a curvature. The display 180 may be provided as a bendable display unit whose curvature is changed.

When the display 180 is provided as a bendable display unit, for example, a curvature change request signal for the display 180 may be input from a user. For example, the curvature change request signal input from the user may be input through the user input interface unit 150. The user input interface unit 150 may transmit the inputted curvature change request signal for the display 180 to the controller 170. The controller 170 may change the curvature of the display 180 according to the user's curvature change request signal.

For example, the user may transmit the curvature change request signal for the display 180 through a remote control device 200.

The display 180 is provided to enable continuous curvature change. A certain curvature may be selected and then the curvature of the display 180 may be changed. Also, the curvature of the display 180 may be changed by selecting any one of a plurality of predetermined curvature levels. For example, the curvature of the display 180 may be implemented as a flat surface, a first curvature 1000R, a second curvature 800R, or the like.

According to the display device 100 according to the embodiment, for example, when a user presses a specific button of the remote control device 200, implementation may be accomplished such that the curvature of the display 180 is sequentially changed to the flat surface, the first curvature, the second curvature, etc.

Also, according to the display device 100 according to the embodiment, while the user is pressing a specific button of the remote control device 200, the curvature of the display 180 may be continuously changed, and the curvature of the display 180 at the point in time at which the user stops to press the specific button may be selected.

Hereinafter, a process of performing tone mapping in a display device according to an embodiment will be further described with reference to FIG. 5.

Figure 5:
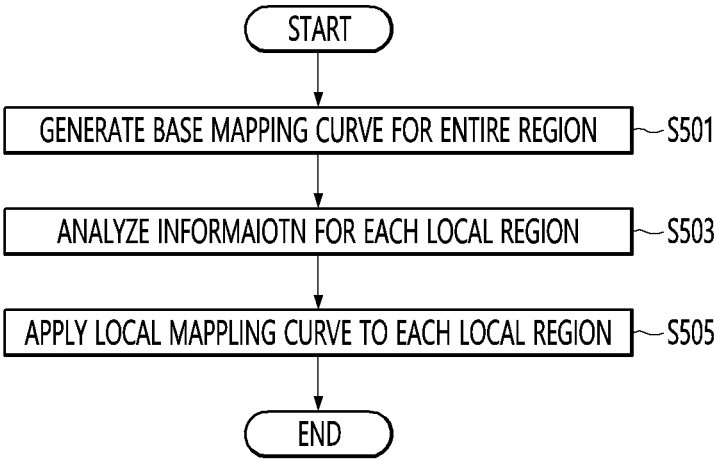
FIG. 5 is a flowchart illustrating a method of driving a display device according to an embodiment of the present disclosure.

FIG. 5 is a flowchart illustrating a method of driving a display device according to an embodiment of the present disclosure.

The controller 170 may generate a base mapping curve for the entire region (S501).

According to the method of driving the display device 100 according to an embodiment, the controller 170 may generate a base mapping curve for the entire region from the input image data.

For example, the base mapping curve may be generated through high dynamic range (HDR) processing on input image data.

The base mapping curve generated by the controller 170 may comprise a dynamic tone mapping (DTM) curve and a dynamic contrast (DC) curve.

When receiving image data, the controller 170 may receive metadata as well. The input image data may be an HDR image. The metadata may comprise information about the input image data. The metadata may comprise at least one of luminance information of an HDR image, maximum brightness information for each scene, and information for identifying an HDR image.

Also, the controller 170 may calculate a luminance distribution histogram in the entire region of the input image data. The luminance distribution histogram of the HDR image may mean distribution information of brightness values of pixels of the HDR image. The controller 170 may calculate a luminance distribution histogram that is a distribution for signal levels (e.g., 0 to 1023) of pixels of the HDR image.

The controller 170 may generate a dynamic tone mapping (DTM) curve based on information on the luminance distribution histogram for the input image data. The DTM curve may mean a mapping curve in the RGB domain. In the RGB domain, mapping from input image data to output image data may be performed according to the generated DTM curve.

The controller 170 may generate a dynamic contrast (DC) curve. The DC curve may mean a mapping curve in the luminance (Y) domain. In the luminance (Y) domain, mapping from input image data to output image data may be performed according to the generated DC curve.

Meanwhile, in order to generate output image data suitable for the characteristics of the display 180 with respect to input image data, a method of generating a DTM curve and a DC curve in the controller 170 is well known, and thus detailed description thereof will be omitted.

Next, the controller 170 may analyze the information for each local region (S503).

According to the method of driving the display device 100 according to an embodiment, the controller 170 may extract information for each local region of the entire region. The controller 170 may extract information for each of local regions constituting the entire region.

For example, the information for each local region may be extracted from a detail map generated based on pixel information of the entire region. The detail map may comprise Average Picture Level (APL) information and sharpness information for each local region.

Figure 6:
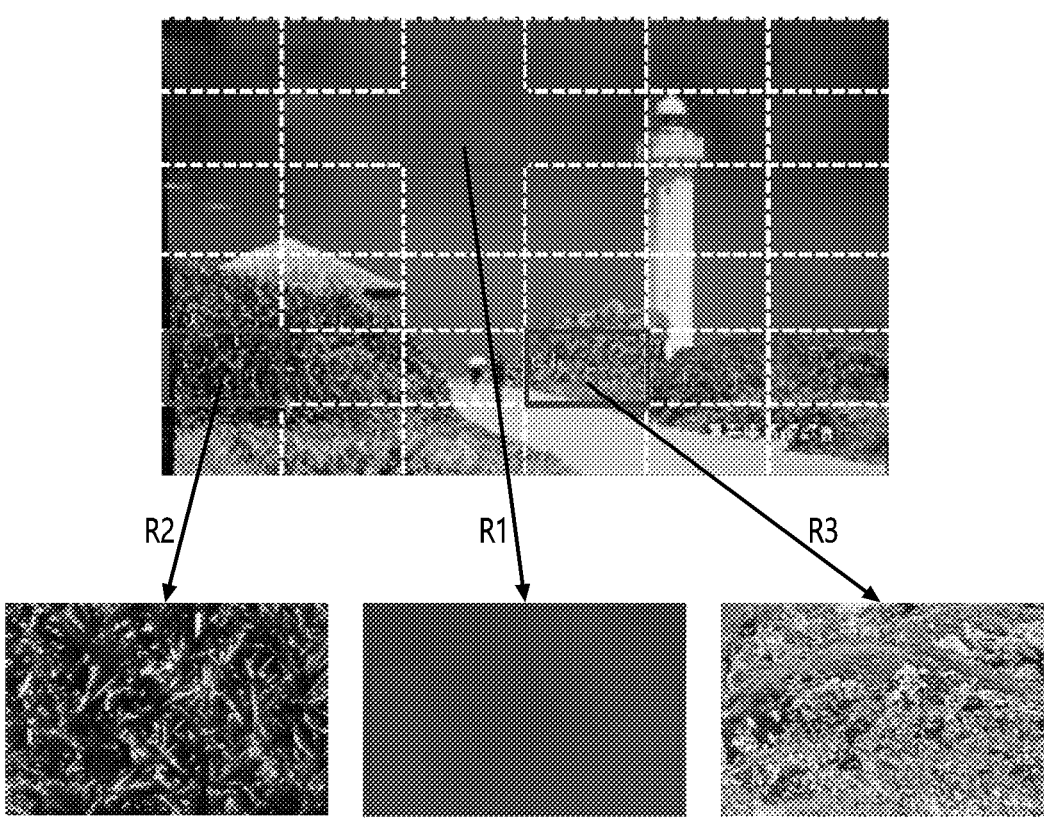
FIG. 6 is a diagram illustrating an example of an HDR-processed image according to an embodiment of the present disclosure.
Figure 7:
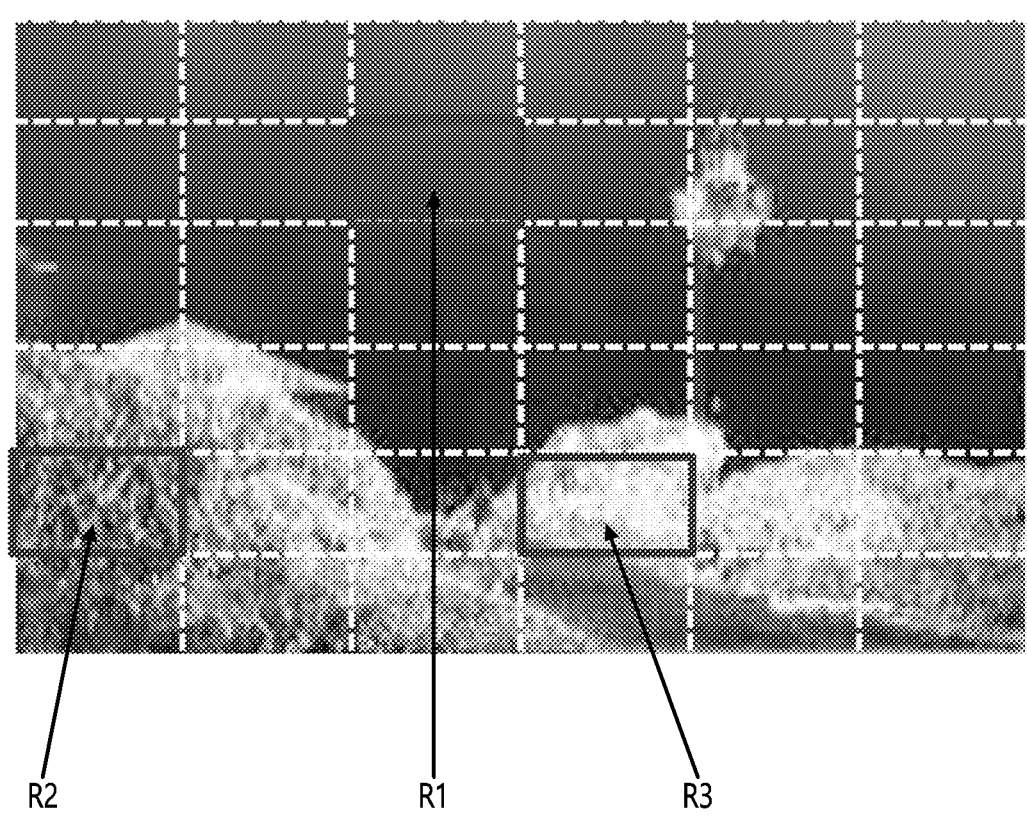
FIG. 7 is a diagram for describing a detail map of the image shown in FIG. 6 according to an embodiment of the present disclosure.

Referring to FIGS. 6 and 7, a detail map according to an embodiment will be described.

FIG. 6 is a diagram illustrating an example of an HDR-processed image according to an embodiment of the present disclosure, and FIG. 7 is a diagram for describing a detail map of the image shown in FIG. 6 according to an embodiment of the present disclosure.

FIG. 6 illustrates an HDR-processed image according to an embodiment, and the entire region of the image may be divided into a plurality of local regions.

The plurality of local regions may be divided into an arbitrary number for the entire region in consideration of image processing speed and effects. For example, when the entire region of the image has a resolution of (1920*1080), the plurality of local regions may be provided in the number of (96*54). This is just one example, and the size and number of the plurality of local regions may be variously changed as needed.

FIG. 7 shows a detail degree of the entire region of the image shown in FIG. 6. The detail degree may be an amount of change in luminance values for adjacent pixels within a predetermined distance. The detail degree of each pixel may mean a step (or rate of change) in each pixel with respect to adjacent pixels. A pixel having a large change in color or luminance compared to neighboring pixels may mean a pixel having a large detail degree.

For example, the detail map may be extracted by applying a Laplacian filter to the entire region. The detail map may be extracted using a variety of other tools or in other ways.

The information for each local region may be extracted from the detail map generated based on the pixel information of the entire region. The detail map may comprise Average Picture Level (APL) information and sharpness information for each local region.

APL information for each local region may mean a brightness degree of each local region. Sharpness information for each local region may mean a detail degree of each local region.

For example, a first region R1 illustrated in FIGS. 6 and 7 may be determined as a region in which there is no change in the detail degree. The first region R1 illustrated in FIGS. 6 and 7 may be determined as a region having no sharpness.

Also, the second region R2 and the third region R3 illustrated in FIGS. 6 and 7 may be determined as regions having a change in the detail degree. The second region R2 and the third region R3 illustrated in FIGS. 6 and 7 may be determined as regions having sharpness.

It can be seen that the APL degrees of the first region R1, the second region R2, and the third region R3 shown in FIGS. 6 and 7 are different from each other.

In this way, the controller 170 may extract APL information and sharpness information of each local region from the detail map.

Next, the controller 170 may apply a local mapping curve for each local region (S505).

A process of generating a local mapping curve for each local region and applying the generated local mapping curve to tone mapping of a corresponding local region in the controller 170 of the display device 100 according to an embodiment will be described.

The display device 100 according to an embodiment of the present disclosure does not perform tone mapping on the entire region using the same mapping curve. The display device 100 according to an embodiment may generate a local mapping curve for each local region in which information of each local region is reflected, and may perform tone mapping for each local region using a corresponding local mapping curve.

The display device 100 according to an embodiment may generate an adaptive local contrast curve for each local region based on the extracted information for each local region, and perform tone mapping for each local region.

The controller 170 may generate a local mapping curve, in which the information for each local region is reflected, for each local region. The controller 170 may generate a local mapping curve of a corresponding local region by using the APL information and sharpness information of each local region.

For example, the respective regions of the first region R1, the second region R2, and the third region R3 have different APL degrees and sharpness degrees. That is, the APL values of the local regions are different from each other, and the sharpness values of the local regions are different from each other. Accordingly, the local mapping curves suitable for the local regions may be generated differently.

The controller 170 may generate a first local mapping curve for the first region R1 based on the APL information and sharpness information of the first region R1. The controller 170 may generate a second local mapping curve for the second region R2 based on the APL information and sharpness information of the second region R2. The controller 170 may generate a third local mapping curve for the third region R3 based on the APL information and sharpness information of the third region R3.

For example, the first region R1 may be determined as a region in which there is no change in the detail degree. That is, the first region R1 may be determined as a region having no sharpness. The controller 170 may perform local tone mapping using the base mapping curve generated for the entire region without generating a separate first local mapping curve for the first region R1.

The second region R2 may be determined as a region in which there is a change in the detail degree. That is, the second region R2 may be determined to be a region having sharpness. The controller 170 may generate a separate second local mapping curve for the second region R2 and perform local tone mapping for the second region R2 using the generated second local mapping curve.

For example, the controller 170 may generate a second local mapping curve capable of enhancing brightness and enhancing contrast of the second region R2. When the sharpness degree of the local region is large, the controller 170 may enhance brightness and contrast of a corresponding local region. The controller 170 may perform local tone mapping for the second region R2 by applying the second local mapping curve instead of the DC curve among the base mapping curves generated for the entire region.

The third region R3 may be determined as a region in which there is a change in the detail degree. That is, the third region R3 may be determined to be a region having sharpness. The controller 170 may generate a separate third local mapping curve for the third region R3 and perform local tone mapping for the third region R3 using the generated third local mapping curve.

For example, the controller 170 may generate a third local mapping curve capable of enhancing brightness and enhancing contrast of the third region R3. When the sharpness degree of the local region is large, the controller 170 may enhance brightness and contrast of a corresponding local region. The controller 170 may perform local tone mapping for the third region R3 by applying a third local mapping curve instead of the DC curve among the base mapping curves generated for the entire region.

The controller 170 may perform tone mapping for each local region using the local mapping curve to which the information for each local region is reflected.

According to an embodiment, the local mapping curve may be generated by additionally adjusting a contrast curve in which information for each local region is reflected for each local region based on the base mapping curve generated for the entire region.

For example, the local mapping curve for the first region R1 may comprise the DTM curve of the base mapping curve generated for the entire region (applied to the RGB domain) and the DC curve of the base mapping curve generated for the entire region (applied to the luminance domain).

The local mapping curve for the second region R2 may comprise the DTM curve of the base mapping curve generated for the entire region (applied to the RGB domain) and a second local mapping curve generated for the second region (applied to the luminance domain).

The local mapping curve for the third region R3 may comprise the DTM curve of the base mapping curve generated for the entire region (applied to the RGB domain) and a third local mapping curve generated for the third region (applied to the luminance domain).

As described above, according to the display device and the driving method thereof according to an embodiment of the present disclosure, it is possible to improve the contrast ratio in the local region by using the information of the local region of images, and to improve the three-dimensional effect of the images and a user's immersion feeling.

According to the display device and the driving method thereof according to an embodiment of the present disclosure, it is possible to improve the contrast ratio in the local region by using the brightness and sharpness information for each region of the local regions of images, and to improve the stereoscopic effect of the images and a user's immersion feeling.

According to the display device and the driving method according to an embodiment of the present disclosure, it is possible to improve the contrast ratio in the local region and improve the stereoscopic effect of the images and a user's immersion feeling by generating an adaptive local contrast curve for each local region based on the extracted information for each local region and performing tone mapping.

Figure 8:
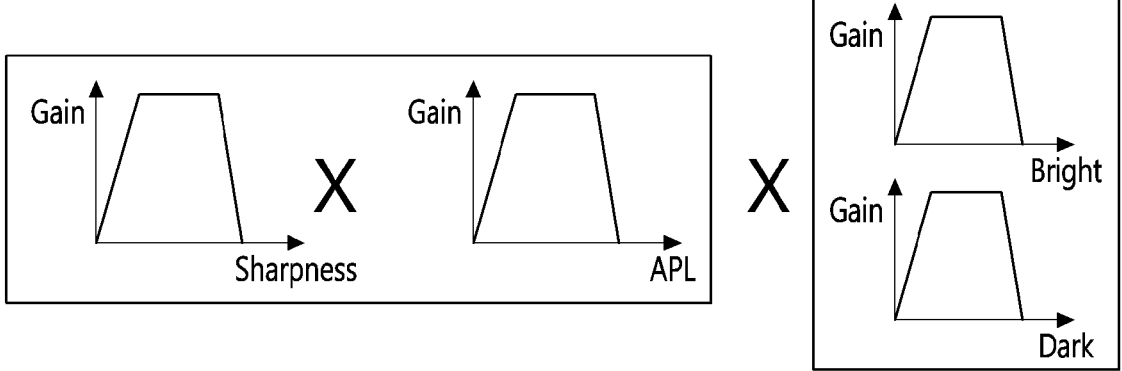
FIG. 8 is a diagram for describing application of gain adjustment to a local region according to detail map information, according to an embodiment of the present disclosure.

FIG. 8 is a diagram for describing application of gain adjustment to a local region according to detail map information, according to an embodiment of the present disclosure.

The controller 170 of the display device 100 according to an embodiment may extract sharpness information and APL information of each local region from a detail map, and determine a degree of brightness enhancement and a degree of contrast enhancement for a corresponding local region.

The controller 170 may determine a degree of brightness enhancement, a degree of contrast enhancement, and the like for a corresponding local region by using at least one of the sharpness information and APL information of each local region.

For example, as shown in FIG. 8, the controller 170 may extract a degree of brightness enhancement and/or a degree of contrast enhancement in the local region by calculating a gain according to the degree of sharpness and a gain according to the degree of APL in each local region. Through this process, the controller 170 may detect a local region of interest on which brightness enhancement and/or contrast enhancement are to be performed.

Also, the controller 170 may adjust an output gain with respect to the input gain by calculating a gain for a bright degree and a gain for a dark degree for the detected gain of the local region of interest.

Through this process, the controller 170 may determine the degree of brightness enhancement and the degree of contrast enhancement for the local region based on the sharpness information and the APL information in each local region.

Meanwhile, the above-described display device 100 according to the embodiment has been described based on a case in which the display 180 has a flat shape.

According to an embodiment, the display 180 may be provided as a curved display unit having a curvature. Also, the display 180 may be provided as a bendable display unit whose curvature is changed.

When the display 180 is provided as a curved display unit or as a bendable display unit, the controller 180 according to an embodiment may generate a local mapping curve reflecting at least one of the APL information, sharpness information, location information, and curvature information of a corresponding local region with respect to each local region and perform tone mapping for each local region.

Figure 9:
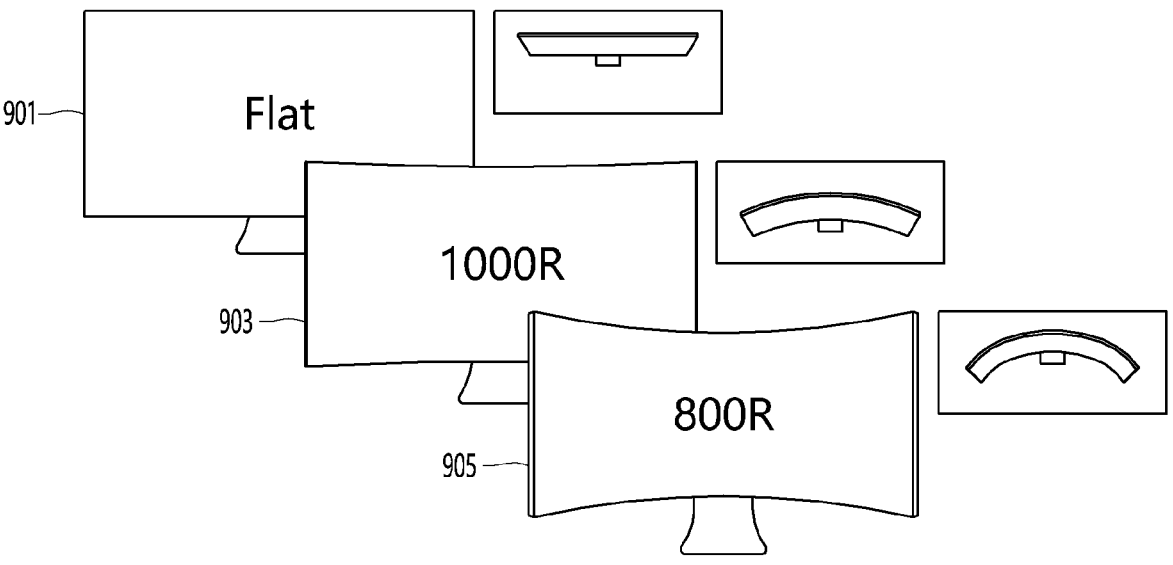
FIG. 9 is a diagram for describing a change in curvature of a display device according to an embodiment of the present disclosure.

FIG. 9 is a diagram for describing a change in curvature of a display device according to an embodiment of the present disclosure.

According to an embodiment, the local mapping curve may be generated by additionally adjusting a contrast curve based on the base mapping curve generated for the entire region, the contrast curve reflecting at least one of the APL information, sharpness information, location information and curvature information of a corresponding local region, for each local region.

For example, the display device 100 may be provided as a bendable display device having a changeable curvature, and the curvature of the display unit may be changed according to a user's request such as a flat display unit 901, a display unit 903 having a first curvature 1000R, and a display unit 905 having a second curvature 800R.

When the display device 100 comprises the flat display unit 901, local mapping curves in the first region R1, the second region R2, and the third region R3 may be determined as described above with reference to FIGS. 5 to 8.

When the display device 100 comprises the display unit 903 having the first curvature, the controller 170 may enhance the degree of the brightness for the first region R1 having no sharpness as compared to a case in which the flat display unit 901 is provided. The controller 170 may further enhance the brightness degree and further enhance the contrast for the second region R2 having sharpness compared to a case in which the flat display unit 901 is provided. The controller 170 may further enhance the brightness degree and further enhance the contrast for the third region R3 having sharpness compared to a case in which the flat display unit 901 is provided.

When the display device 100 comprises the display unit 905 having the second curvature, the controller 170 may enhance the degree of the brightness for the first region R1 having no sharpness as compared to a case in which the display unit 903 having the first curvature is provided. The controller 170 may further enhance the brightness degree and further enhance the contrast for the second region R2 having sharpness compared to a case in which the display unit 903 having the first curvature is provided. The controller 170 may further enhance the brightness degree and further enhance the contrast for the third region R3 having sharpness compared to a case in which the display unit 903 having the first curvature is provided.

When the curvature of the corresponding local region is large, the controller 170 of the display device 100 according to an embodiment may enhance the brightness and contrast of the corresponding local region.

The controller 170 of the display device 100 according to an embodiment may enhance brightness when the corresponding local region has a curvature and the corresponding local region is located in the center of the entire region. The controller 170 may enhance contrast when the corresponding local region has a curvature and the corresponding local region is located on the side of the entire region.

The controller 170 may generate a first local mapping curve for the first region R1 based on the APL information, sharpness information, location information, and curvature information of the first region. The controller 170 may generate a second local mapping curve for the second region R2 based on the APL information, sharpness information, location information, and curvature information of the second region. The controller 170 may generate a third local mapping curve for the third region R3 based on the APL information, sharpness information, location information, and curvature information of the third region.

The controller 170 may perform tone mapping for each local region using the local mapping curve to which the information for each local region is reflected.

As described above, according to the bendable display device and the driving method thereof according to an embodiment of the present disclosure, it is possible to improve the contrast ratio in the local region by using the information of the local region of images, and to improve the stereoscopic effect of the images and a user's immersion feeling.

According to the bendable display device and the driving method thereof according to an embodiment of the present disclosure, it is possible to improve the contrast ratio in the local region by using the brightness and sharpness information for each region of the local regions of the images, and to improve the stereoscopic effect of the images and a user's immersion feeling.

According to the bendable display device and the driving method thereof according to an embodiment of the present disclosure, it is possible to improve the contrast ratio in the local region by using the brightness and sharpness information and location information for each region of the local regions of images, and to improve the stereoscopic effect of the images and a user's immersion feeling.

According to the bendable display device and the driving method thereof according to an embodiment of the present disclosure, it is possible to further improve the stereoscopic effect of the image and user immersion feeling by utilizing the brightness, sharpness information, location information, and curvature information for each region of the local regions of the image.

According to the bendable display device and the driving method according to an embodiment of the present disclosure, it is possible to improve the contrast ratio in the local region and improve the stereoscopic effect of the images and a user's immersion feeling by generating an adaptive local contrast curve for each local region based on the extracted information for each local region and performing tone mapping.

When the display 180 is provided as a bendable display unit, for example, a curvature change request signal for the display 180 may be input from a user. For example, the curvature change request signal input from the user may be input through the user input interface unit 150. The user input interface unit 150 may transmit the inputted curvature change request signal for the display 180 to the controller 170. The controller 170 may change the curvature of the display 180 according to the user's curvature change request signal. The controller 170 may adjust a local mapping curve of each local region according to the curvature of the display 180.

Figure 10:
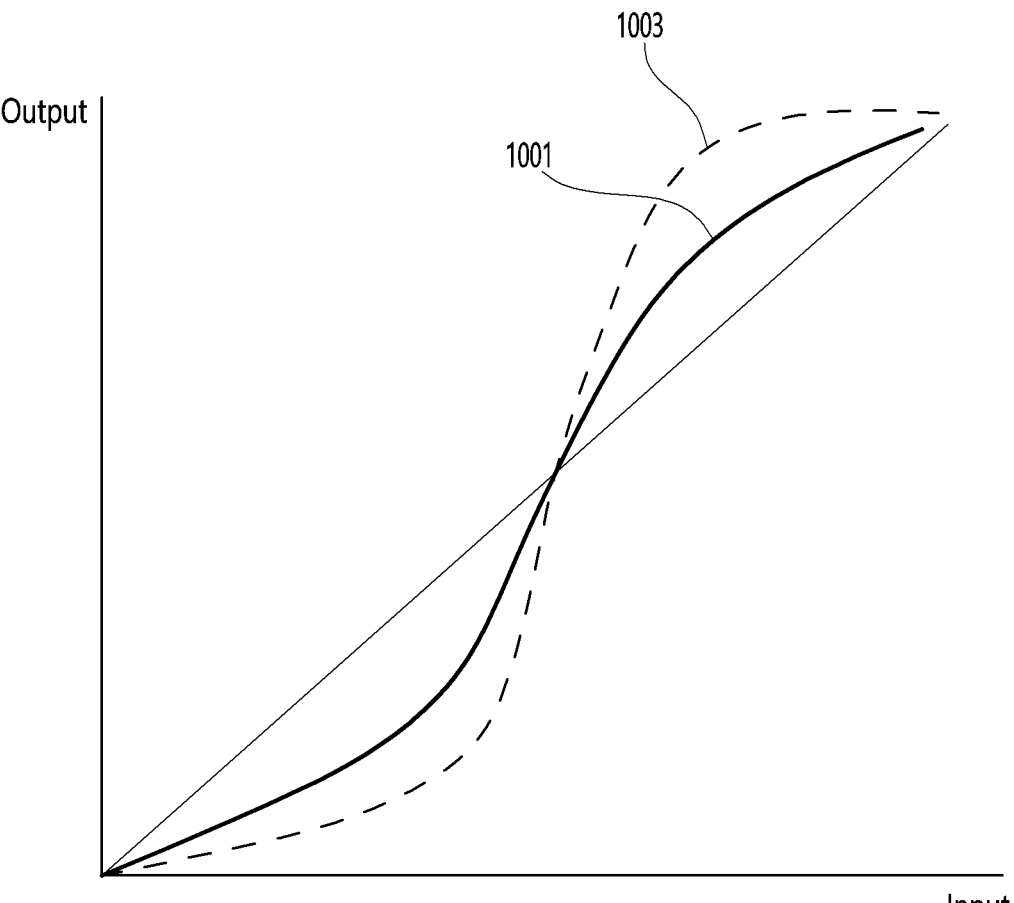
FIG. 10 is a diagram for describing an example of a local region contrast curve to be applied to a local region, according to an embodiment of the present disclosure.

FIG. 10 is a diagram for describing an example of a local region contrast curve to be applied to a local region, according to an embodiment of the present disclosure.

The controller 170 of the display device 100 according to an embodiment may extract information for each local region of the entire region, and generate a local region contrast curve in which the information for each local region is reflected for each local region.

The local region contrast curve may refer to the first local mapping curve, the second local mapping curve, and the third local mapping curve described above.

The first curve 1001 illustrated in FIG. 10 may be the DC curve of the base mapping curves for the entire region. The second curve 1003 represents an example of a local region contrast curve.

The second curve 1003 may correspond to the first local mapping curve, the second local mapping curve, and the third local mapping curve described with reference to FIGS. 5 to 8. In this case, the contrast of the second curve 1003 may be adjusted based on a gain determined from the APL information and the sharpness information of the local region. The first local mapping curve, the second local mapping curve, and the third local mapping curve may be generated based on information of each local region, and may be generated as local contrast curves having different shapes.

Also, the second curve 1003 may correspond to the first local mapping curve, the second local mapping curve, and the third local mapping curve described with reference to FIG. 9. In this case, the contrast of the second curve 1003 may be adjusted based on a gain determined from the APL information, sharpness information, location information, and curvature information of the local region. The first local mapping curve, the second local mapping curve, and the third local mapping curve may be generated based on information of each local region, and may be generated as local contrast curves having different shapes.

Meanwhile, the controller 170 of the display device 100 according to an embodiment may set a maximum value of the second curve 1003. The reason for this is that, when the contrast is excessively enhanced, problems such as burying of low gradations and saturation of high gradations may occur. For example, when the second curve 1003 shown in FIG. 10 is a curve representing the maximum value set by the controller 170, the first, second, and third local mapping curves generated for each local region may be generated to have a value between the curve 1001 and the second curve 1003.

Figure 11:
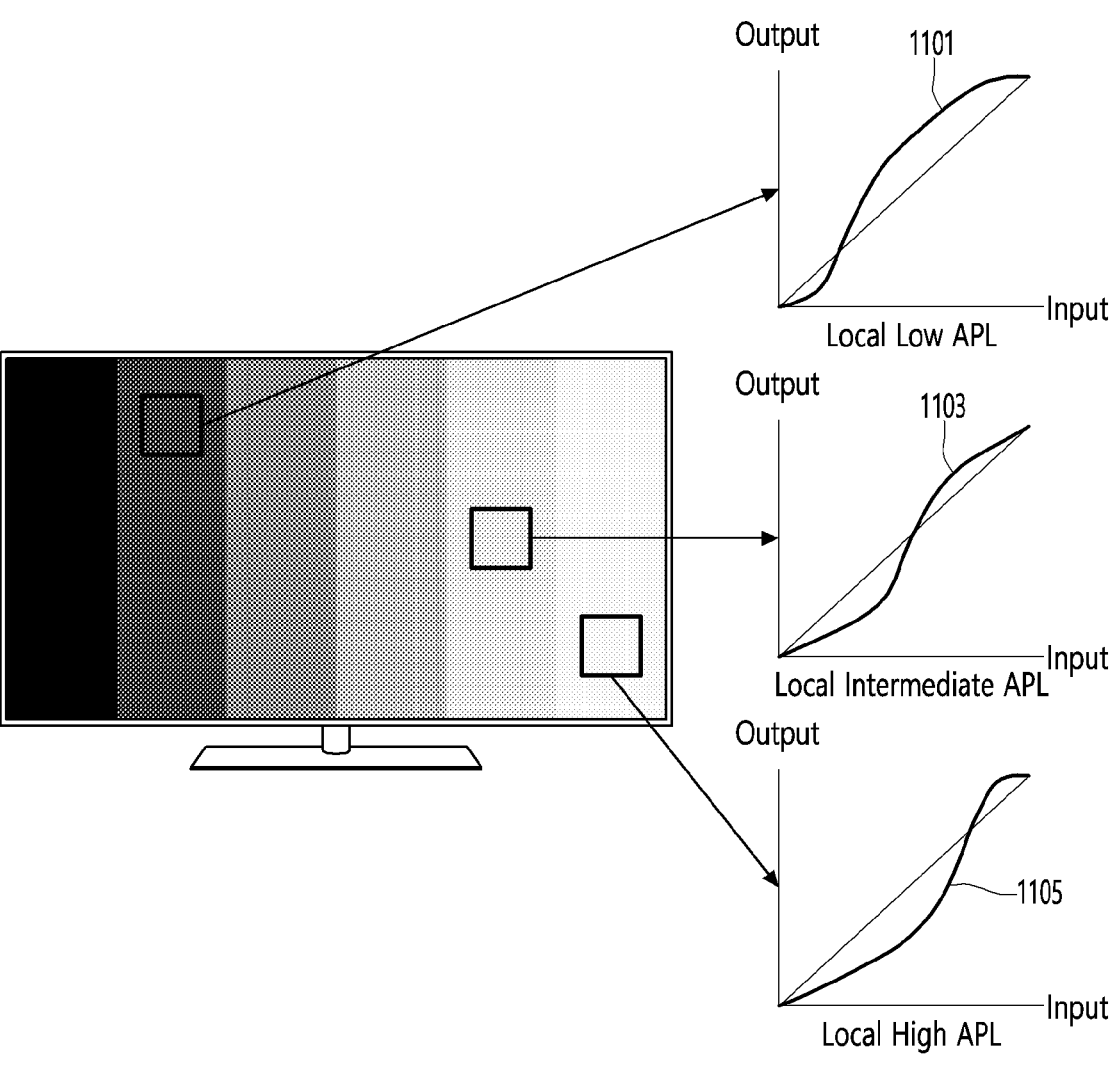
FIG. 11 is a diagram for describing an example of a local contrast curve applied for each APL, according to an embodiment of the present disclosure.

FIG. 11 is a diagram for describing an example of a local contrast curve applied for each APL, according to an embodiment of the present disclosure.

The controller 170 of the display device 100 according to an embodiment may generate different adaptive local contrast curves according to the APL information of the local region.

For example, when the APL degree of the local region has a relatively low value, the controller 170 may generate a local contrast curve of the first curve 1101. When the APL degree of the local region has a relatively intermediate value, the controller 170 may generate a local contrast curve of the second curve 1103. When the APL degree of the local region has a relatively high value, the controller 170 may generate a local contrast curve of the third curve 1105.

For example, in the case where the APL degree of the local region has a relatively intermediate value, the second curve 1103 may be set such that an APL value at a point where the ratio of an input value to an output value is 1 is larger than that of the first curve 1101. In the case where the APL degree of the local region has a relatively intermediate value, the second curve 1103 may be set such that an APL value at a point where the ratio of an input value to an output value is 1 is less than that of the third curve 1105.

As described above, the controller 170 may adjust the shape of the local contrast curve of the local region according to the degree of APL of the local region. By measuring the degree of a change in the local contrast curve of the corresponding region according to the change in the APL degree of the local region in the display device 100, it may be determined whether the concept of the adaptive local mapping curve proposed in the present disclosure is applied. When the local contrast curve tends to change according to the change in the APL degree of the local region, it may be determined that the concept of the adaptive local mapping curve proposed in the present disclosure has been applied.

Figure 12:
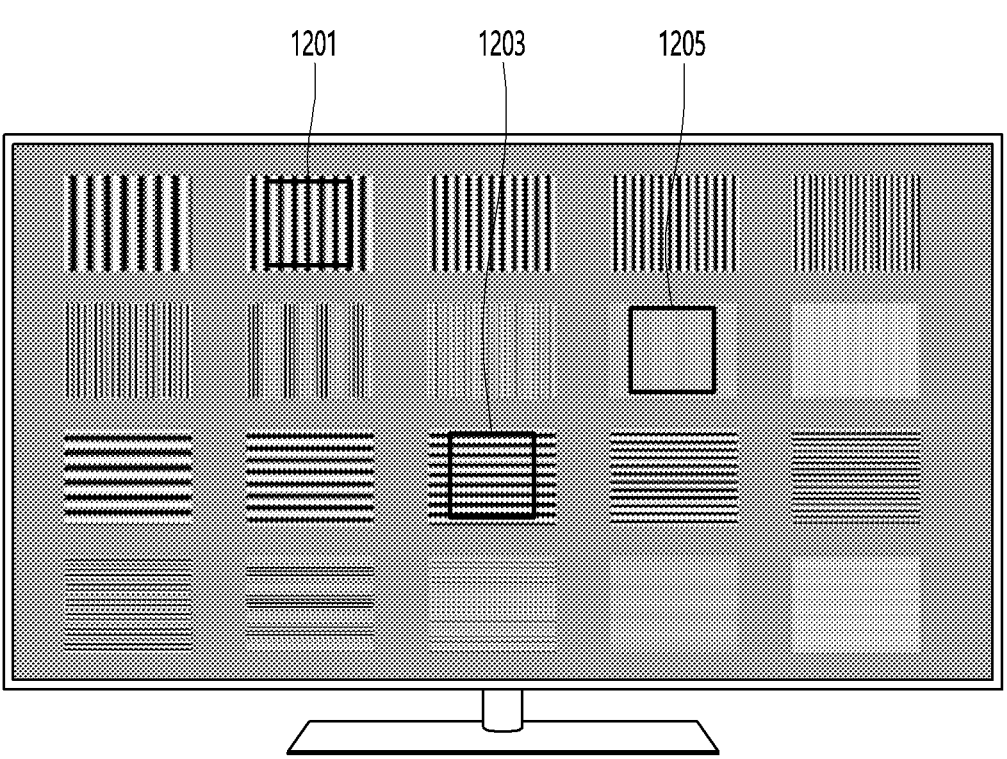
FIG. 12 is a diagram for describing a case in which different sharpness is applied in the same APL according to an embodiment of the present disclosure.

FIG. 12 is a diagram for describing a case in which different sharpness is applied in the same APL according to an embodiment of the present disclosure.

The controller 170 of the display device 100 according to an embodiment may generate different adaptive local contrast curves according to the sharpness information of the local region.

For example, in local regions having the same APL degree, the controller 170 may allow the local contrast to tend to be larger as the sharpness degree of the local region is greater. The controller 170 may generate a local contrast curve of the corresponding local region such that a bright region becomes brighter and a dark region becomes darker as the sharpness degree of the local region is greater.

The controller 170 may generate local contrast curves having different contrast tendencies for different sharpness of the same APL.

The controller 170 may generate a local contrast curve having a relatively high contrast tendency with respect to a first sharpness pattern 1201 having a relatively high sharpness value. The controller 170 may generate a local contrast curve having a relatively intermediate contrast tendency with respect to a second sharpness pattern 1203 having a relatively intermediate sharpness value. The controller 170 may generate a local contrast curve having a relatively low contrast tendency with respect to a third sharpness pattern 1205 having a relatively low sharpness value.

As described above, the controller 170 may adjust the shape of the adaptive local contrast curve according to the sharpness degree of the local region. It may be determined whether the adaptive local mapping curve concept proposed in the present disclosure has been applied, by detecting a change in local contrast through luminance measurement with respect to a change in sharpness degree in the local region in the display device 100. When the local contrast tends to change through the luminance measurement with respect to a change in the degree of sharpness in the local region, it may be determined that the concept of the adaptive local mapping curve proposed in the present disclosure has been applied.

Figure 13:
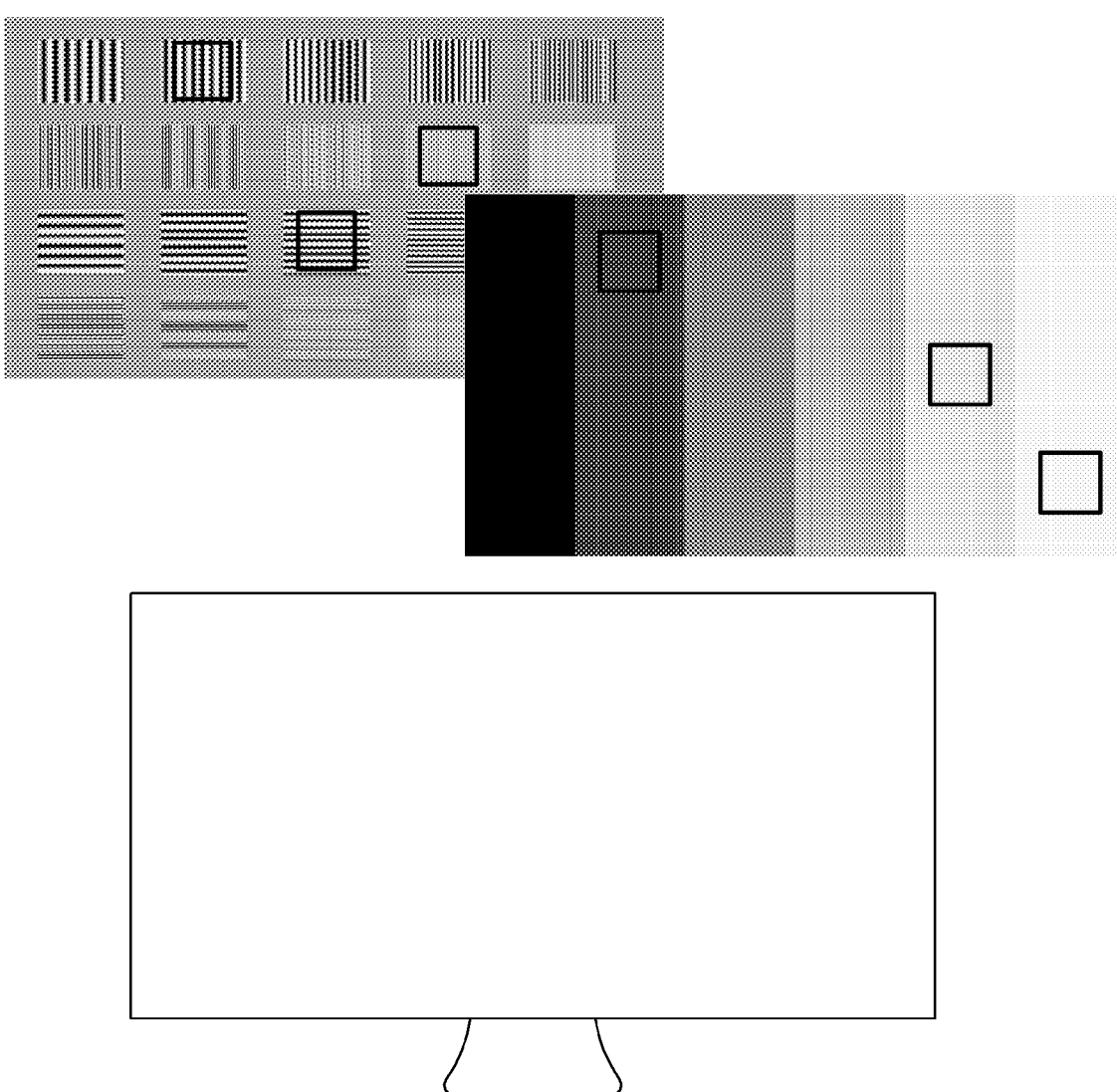
FIG. 13 is a diagram for describing a case in which a local region contrast curve for each APL according to a change in curvature and different sharpnesses are applied to the same APL according to an embodiment of the present disclosure.

FIG. 13 is a diagram for describing a case in which a local region contrast curve for each APL according to a change in curvature and different sharpnesses are applied to the same APL according to an embodiment of the present disclosure.

The controller 170 according to an embodiment may generate different adaptive local contrast curves according to the curvature information of the local region. The controller 170 may generate different adaptive local contrast curves according to the curvature information and APL information of the local region. The controller 170 may generate different adaptive local contrast curves according to the curvature information and sharpness information of the local region. The controller 170 may generate different adaptive local contrast curves according to the curvature information, APL information, and sharpness information of the local region.

As described above, the controller 170 may adjust a shape of the local contrast curve of the local region according to the curvature information of the local region. By measuring the degree of a change in the local contrast curve of the corresponding region according to the change in the curvature degree of the local region in the display device 100, it may be determined whether the concept of the adaptive local mapping curve proposed in the present disclosure is applied. When the local contrast curve tends to change according to the change in the curvature degree of the local region, it may be determined that the concept of the adaptive local mapping curve proposed in the present disclosure has been applied.

The controller 170 may perform tone mapping for each local region using the adaptive local mapping curve to which the information for each local region is reflected.

An image according to the output image data in which adaptive local tone mapping is performed for each local region by the controller 170 may be displayed on the display 180.

According to the display device and the driving method thereof according to an embodiment of the present disclosure, it is possible to improve the contrast ratio in the local region by using the information of the local region of images, and to improve the stereoscopic effect of the images and a user's immersion feeling.

According to the display device and the driving method thereof according to an embodiment of the present disclosure, it is possible to improve the contrast ratio in the local region by using the APL information, sharpness information and location information of the local region of images, and to improve the stereoscopic effect of the images and a user's immersion feeling.

According to the display device and the driving method thereof according to an embodiment of the present disclosure, it is possible to further improve the stereoscopic effect of the image and user immersion feeling by utilizing the APL information, sharpness information, location information, and curvature information for each region of the local regions of the image.

According to the display device and the driving method according to an embodiment of the present disclosure, it is possible to more improve the stereoscopic effect of the images and a user's immersion feeling by performing an adaptive local tone mapping for each local region based on the information for each local region of images.

Figure 14:
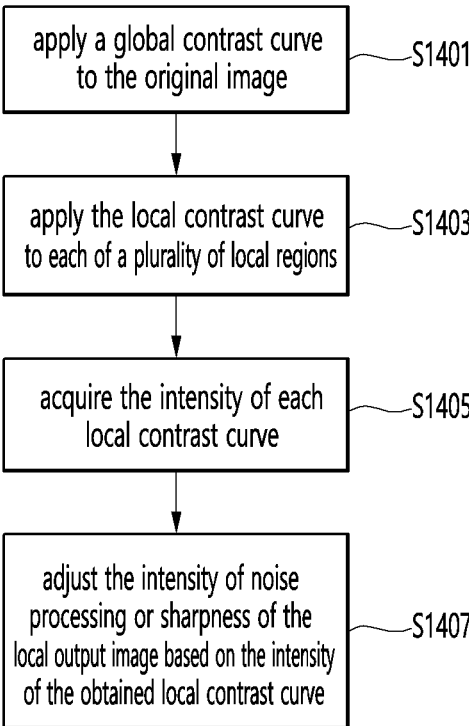
FIG. 14 is a flowchart illustrating a method of driving a display device according to another exemplary embodiment of the present disclosure.

FIG. 14 is a flowchart illustrating a method of driving a display device according to another exemplary embodiment of the present disclosure.

Referring to FIG. 14, the controller 170 may apply a global contrast curve to the entire region of the original image (S1401).

The global contrast curve may be a dynamic contrast curve for the entire region of the original image.

The dynamic contrast curve may be a curve that brightens a bright part of an image and darkens a dark part of an image.

When receiving image data, the controller 170 may also receive metadata. The input image data may be HDR image.

Meta data may include information about input image data. Meta data may include at least one of luminance information of an HDR image, maximum brightness information for each scene, or information for identifying an HDR image.

Also, the controller 170 may calculate a luminance distribution histogram in the entire region of the input image data.

The luminance distribution histogram of the HDR image may mean distribution information of brightness values of each pixel of the HDR image. The controller 170 may calculate a luminance distribution histogram, which is a distribution of signal level (ex, 0 to 1023) of each pixel of the HDR image.

The controller 170 may generate a Dynamic Tone Mapping (DTM) curve based on luminance distribution histogram information for the input image data. The DTM curve may mean a mapping curve in the RGB domain. In the RGB domain, mapping may be performed from input image data to output image data according to the generated DTM curve.

The controller 170 may generate a global dynamic contrast (DC) curve. The DC curve may mean a mapping curve in the luminance (Y) domain. In the luminance (Y) domain, mapping may be performed from input image data to output image data according to the generated TC curve.

Meanwhile, in order to generate output image data suitable for the characteristic of the display 180 with respect to the input image data, since a method of generating a DTM curve and a DC curve in the controller 170 is well known, a detailed description thereof is omitted here.

After applying the global contrast curve to the original image, the controller 170 may apply the local contrast curve to each of a plurality of local regions constituting the entire region of the original image (S1403).

The entire region of the original image may be divided into a plurality of local regions.

The controller 170 may apply a local contrast cover to each local area in order to enhance the expressiveness of the local area (or local block) brightened or darkened by the global DC curve.

The controller 170 may obtain an APL of each local area and apply a local contrast curve to each local area according to the obtained APL.

That is, the local contrast curve may also be changed according to the APL of the local area.

The embodiments of FIGS. 5 to 11 may be used for an embodiment of applying a different local contrast curve according to the APL of the local area.

The controller 170 acquires the intensity of each local contrast curve (S1405), and may adjust the intensity of noise processing or sharpness of the local output image to which the local contrast curve is applied based on the intensity of the obtained local contrast curve (S1407).

The intensity of the local contrast curve may vary according to the APL of the local area (local APL).

In an embodiment, the intensity of the local contrast curve may correspond to the slope of the local contrast curve.

The storage 140 of the display device 100 may store the correspondence between the intensity of the local contrast curve and the processing intensity of noise, the correspondence between the intensity of the local contrast curve and the intensity of sharpness, the correspondence between the intensity of the local contrast curve, the intensity of noise processing, and the intensity of the sharpness as a look-up table (LUT).

If the intensity of the local contrast curve increases, the controller 170 may increase the intensity of noise processing and decrease the intensity of sharpness.

If the intensity of the local contrast curve decreases, the controller 170 may decrease the intensity of noise processing and increase the intensity of sharpness.

The processing intensity of noise and the intensity of sharpness may be in inverse proportion to each other. That is, as the processing intensity of noise increases, the intensity of sharpness may decrease, and as the processing intensity of noise decreases, the intensity of sharpness may increase.

When noise processing is unnecessary, the controller 170 may adjust only the intensity of sharpness according to the intensity of the local contrast curve.

The controller 170 may output, to the display 180, an image with at least one of the intensity of noise processing or the intensity of sharpness adjusted.

Figure 15A:
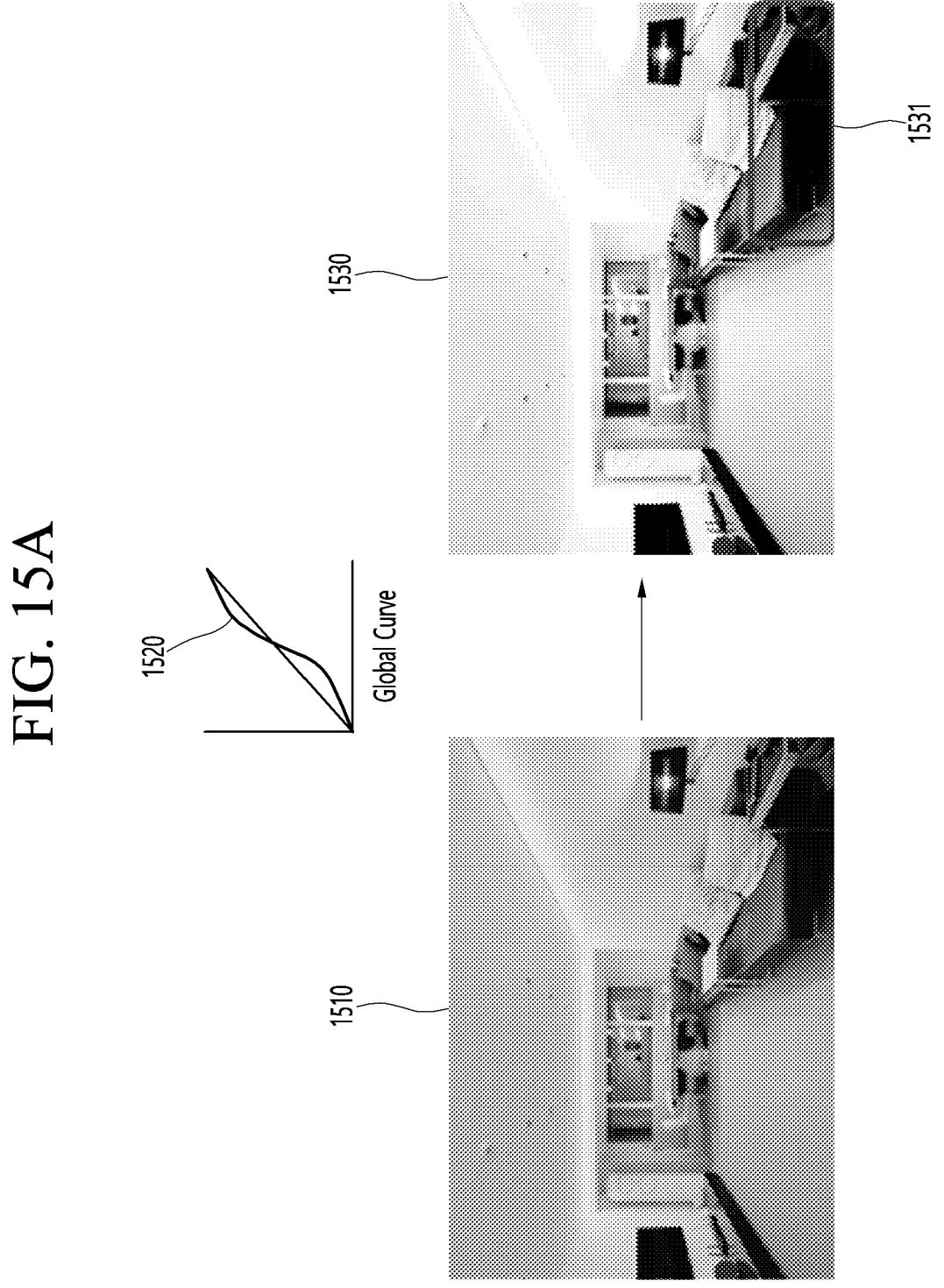
FIGS. 15A and 15B are diagrams illustrating a process of adjusting noise intensity or sharpness intensity of a local area among all areas of an original image according to an embodiment of the present disclosure.
Figure 15B:
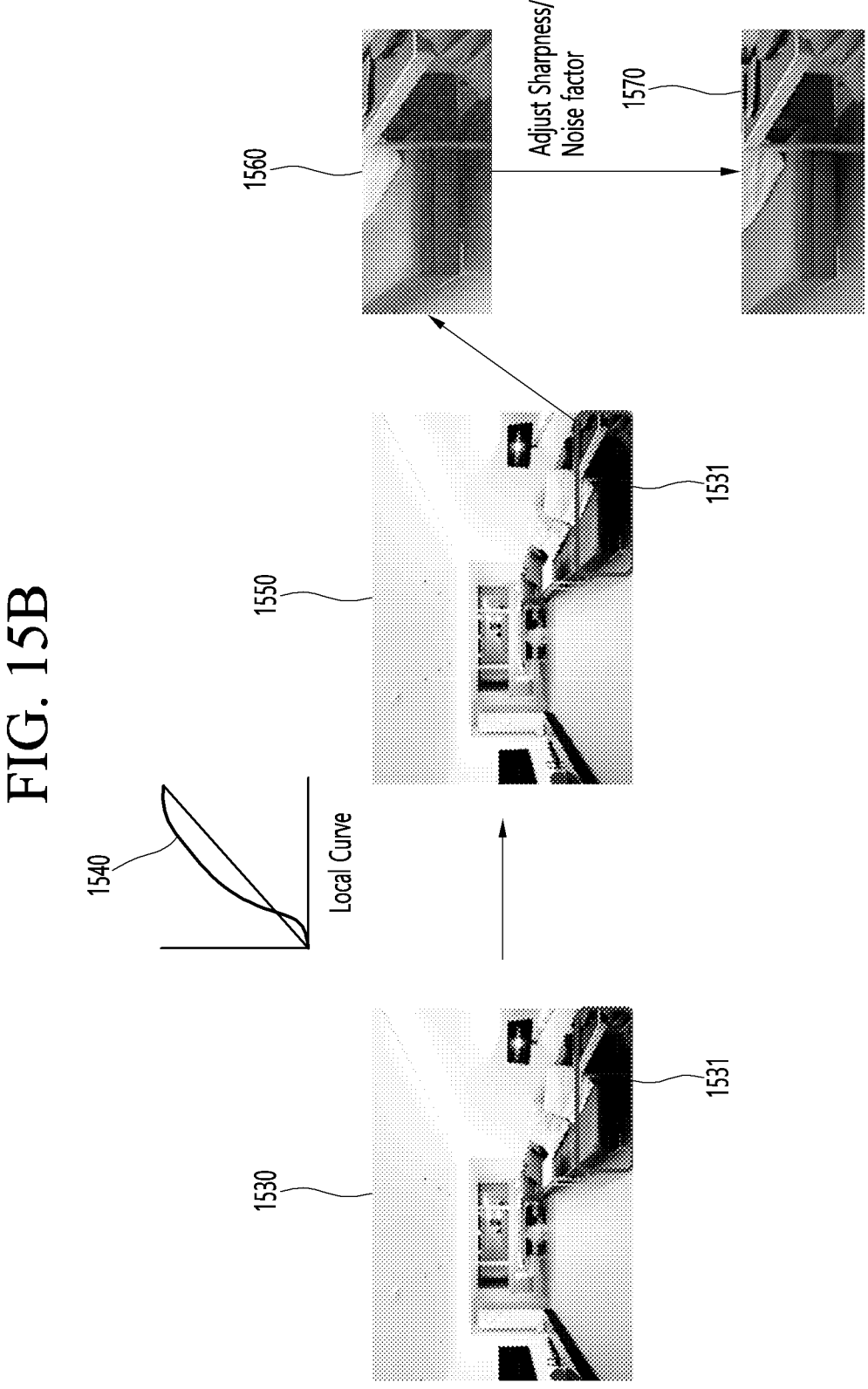

FIGS. 15A and 15B are diagrams illustrating a process of adjusting noise intensity or sharpness intensity of a local area among all areas of an original image according to an embodiment of the present disclosure.

Referring to FIG. 15A, an original image 1510 may be output to the display 180.

The original image 1510 may be an image received through the external device interface 135, the network interface 133, the tuner 131, or the wireless communication interface 173.

The controller 170 may generate a first output image 1530 by applying the global contrast curve 1520 to the original image 1510.

The controller 170 may measure the APL of the entire area of the original image 1510 and generate a global contrast curve 1520 based on the measured APL.

The global contrast curve 1520 may be a curve that adjusts the luminance of the image so that bright parts of the image are displayed brighter and dark parts of the image are displayed darker.

The image of the local area 1531 of the first output image 1530 may be expressed darker than the original by the global contrast curve 1510.

As shown in FIG. 15B, the controller 170 may obtain a local APL of the local area 1531 to enhance the expressive power of the local area 1531, and generate a local contrast curve 1540 based on the obtained local APL.

The controller 170 may generate the second output image 1550 by applying the local contrast curve 1540 to the local area 1531 of the first output image 1530.

The local image 1560 displayed in the local area 1531 of the second output image 1550 may be boosted with digital noise generated while forcibly changing the image signal.

Accordingly, digital noise may be visually observed and deterioration in image quality may occur.

The controller 170 may adjust at least one of noise processing intensity and sharpness intensity based on the intensity of the local contrast curve 1540 corresponding to the local region 1531.

Accordingly, noise of the local image 1560 may be removed, and a clear image may be provided.

Figure 16:
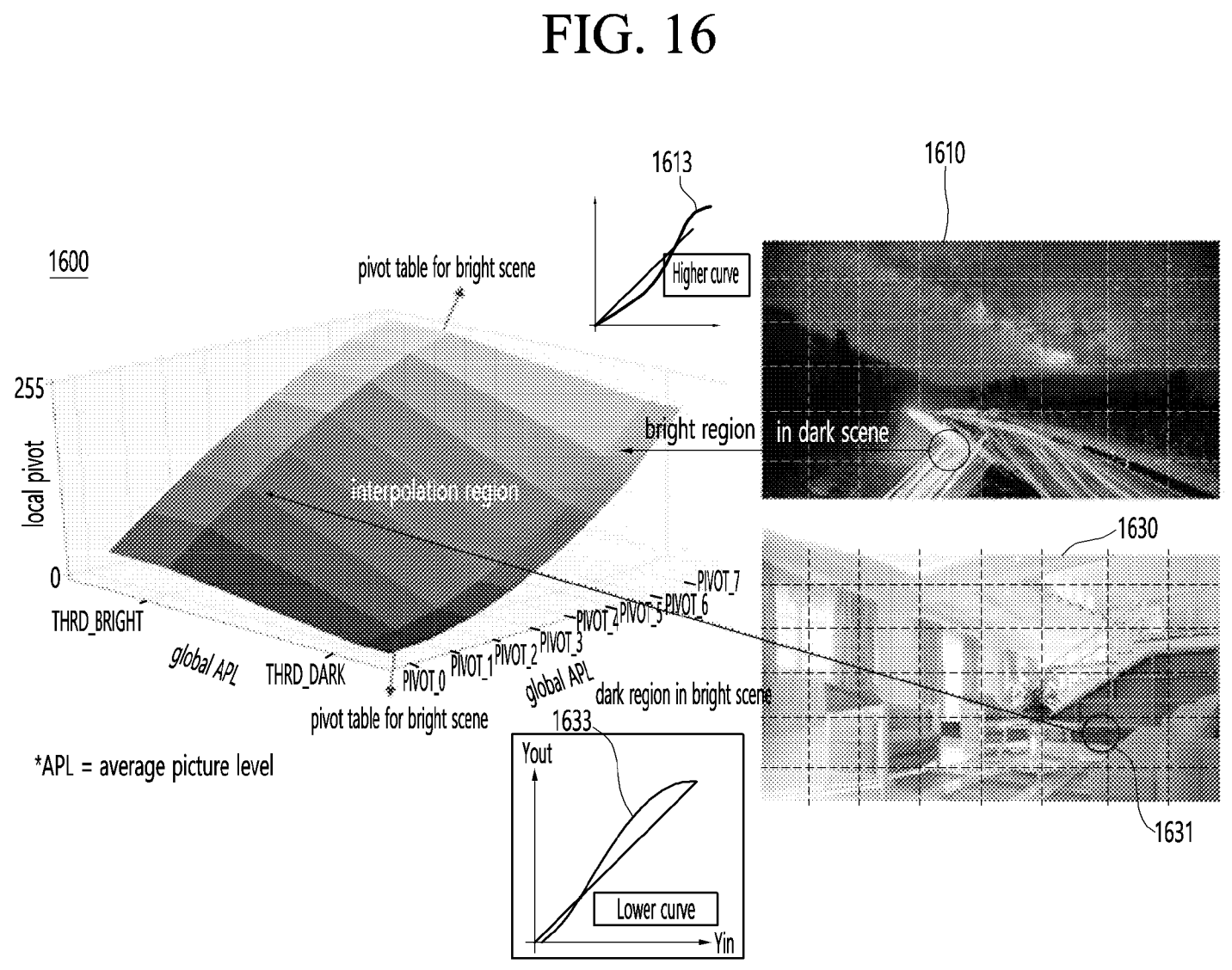

FIG. 16 is a diagram illustrating a pivot table according to local APL.

The pivot table 1600 may be a table representing local APL of each of a plurality of local areas included in the entire area of the image.

The pivot table 1600 may include a pivot table for a bright scene, a pivot table for a dark scene, and an interpolation area.

The first image 1610 is a dark image as a whole, but includes a bright region 1611. The bright area 1611 can be matched to a pivot table for dark scene.

The second image 1630 is a bright image as a whole, but includes a dark region 1631. The dark area 1631 can be matched to a pivot table for bright scene.

The controller 170 may obtain a local APL of the bright area 1611 of the first image 1610 and generate a first local contrast curve 1613 based on the local APL.

The controller 170 may express a high grayscale by applying a first local contrast curve 1613 having a low intensity to the bright area 1611 of the first image 1610.

However, in this case, digital noise may be generated. The controller 170 may acquire the intensity of the first local contrast curve 1613, and acquire noise processing intensity or sharpness intensity corresponding to the obtained intensity.

The controller 170 may extract noise processing intensity or sharpness intensity matching the intensity of the first local contrast curve 1613 using the lookup table stored in the storage 140.

The controller 170 may apply the extracted noise processing intensity or sharpness intensity to the bright area 1611 of the first image 1610.

The controller 170 may obtain a local APL of the dark area 1631 of the second image 1630 and generate a second local contrast curve 1633 based on the local APL.

The controller 170 may apply a second local contrast curve 1633 having a high intensity to the dark region 1611 of the second image 1630 to express a low gray level.

However, in this case, digital noise may be generated while the dark area 1611 is expressed. The controller 170 may acquire the intensity of the second local contrast curve 1633, and acquire noise processing intensity or sharpness intensity corresponding to the obtained intensity.

The controller 170 may extract the noise processing intensity or the sharpness intensity matching the intensity of the second local contrast curve 1633 using the lookup table stored in the storage 140.

The controller 170 may apply the extracted noise processing intensity or sharpness intensity to the dark area 1631 of the second image 1630.

Accordingly, noise in the dark area 1631 is suppressed, and image quality deterioration in the darker area 1631 can be prevented.

FIG. 17A is a diagram illustrating a look-up table for classifying some of the entire regions of a dark image as bright regions according to APL and adjusting noise or sharpness of each classified bright region.

FIG. 17B is a diagram illustrating a look-up table for classifying some of the entire areas of a bright image as dark areas according to APL and adjusting noise or sharpness of each classified dark area.

The lookup table 1700 may be stored in the storage 140.

Referring to FIG. 17A, a plurality of bright areas (PIVOT_DARK0 to PIVOT_DARK7) among all areas of a dark image may be classified according to the APL of each area.

Each bright area may be mapped to a point of the pivot table 1600 described in FIG. 16.

The controller 170 may obtain at least one of noise processing intensity or sharpness intensity corresponding to each bright area through the lookup table 1700.

The controller 170 may apply the obtained noise processing intensity or sharpness intensity to the corresponding bright area. Accordingly, digital noise may be processed for a bright image or an image with enhanced sharpness may be output through the display 180.

Referring to FIG. 17B, a plurality of dark areas (PIVOT_BRIGHT0 to PIVOT_BRIGHT 7) among the entire areas of a bright image may be classified according to the APL of each area.

Each dark area may be mapped to a point of the pivot table 1600 described in FIG. 16.

The controller 170 may obtain at least one of noise processing intensity or sharpness intensity corresponding to each dark area through the lookup table 1700.

The controller 170 may apply the acquired noise processing intensity or sharpness intensity to the corresponding dark area. Accordingly, digital noise may be processed for a dark image or an image with enhanced sharpness may be output through the display 180.

Figure 18:
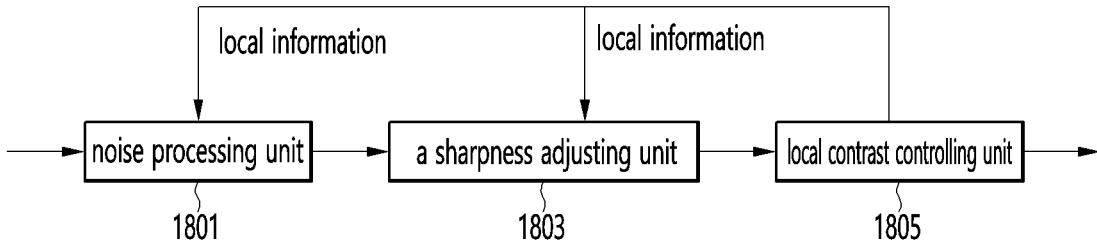
FIG. 18 is a diagram for explaining the configuration of a control unit according to an embodiment of the present disclosure.

FIG. 18 is a diagram for explaining the configuration of a control unit according to an embodiment of the present disclosure.

Referring to FIG. 18, the controller 170 may include a noise processing unit 1801, a sharpness adjusting unit 1803, and a local contrast controlling unit 1805.

The noise processing unit 1801 may remove noise from an image. A low-pass filter of the noise processor 1801 may be included.

The low-pass filter may remove an image signal corresponding to a high frequency and pass an image signal corresponding to a relatively low frequency.

The noise processing intensity may be adjusted according to the local APL of the local area of the noise processing unit 1801 or the intensity (or gain) of a local contrast curve based on the local APL.

The noise processing intensity may be the intensity of the low pass filter.

The noise processing unit 1801 may adjust noise processing intensity based on local information of the local area. The local information of the local area may include one or more of an APL of the local area or an intensity of a local contrast curve.

The noise processor 1801 may receive local information through the local contrast controller 1805.

The sharpness control unit 1803 may adjust the intensity of sharpness of the noise-processed image.

The sharpness control unit 1803 may adjust the intensity of sharpness of the image using one or more of an unsharp mask filter, a sharp mask filter, and a blur filter.

The intensity of the sharpness may represent the intensity of each filter.

The sharpness adjusting unit 1803 may adjust the sharpness according to the local APL of the local area or the intensity (or gain) of a local contrast curve based on the local APL.

The sharpness control unit 1803 may adjust the intensity of sharpness based on local information of the local area. The local information of the local area may include one or more of an APL of the local area or an intensity of a local contrast curve.

The sharpness adjusting unit 1803 may receive local information through the local contrast controlling unit 1805.

The local contrast control unit 1805 may obtain a local APL of each of a plurality of local areas constituting the entire area of the image, and generate a local contrast curve based on the obtained local APL.

The local contrast controller 1805 may apply the generated local contrast curve to a corresponding local area.

Conventionally, since a component for controlling local contrast for a local area is located behind a noise processing unit and a sharpness adjusting unit, there is no factor capable of removing digital noise or detail loss caused by a local contrast curve.

Therefore, there is a problem in that there is a difference in detail loss or amount of noise in the visibly bright and dark areas according to the intensity of the local contrast curve of the corresponding local area.

The display device 100 according to an embodiment of the present disclosure may adjust processing intensity of digital noise generated by a local contrast curve or intensity of sharpness for each local region according to local information.

Accordingly, digital noise generated in each local area is suppressed and detail loss is greatly reduced, so that clear and sharp picture quality can be provided.

Meanwhile, whether the concept of adjusting the intensity of noise processing or the intensity of sharpness according to local information according to the present disclosure is applied may be determined through the following process.

First, as shown in FIG. 11, It can be determined whether or not the adaptive local mapping curve concept proposed in the present disclosure is applied by measuring the degree of change of the local contrast curve of a corresponding region according to the change of the APL degree of the local region in the display device 100.

That is, if the local contrast curve tends to change according to the change in the APL degree of the local area, it can be determined that the concept of the adaptive local mapping curve proposed in the present disclosure is applied.

In addition, if the brightness of the corresponding local area tends to become brighter or darker as the intensity of sharpness or noise processing of each local area increases, it may be determined that the concept of adjusting the intensity of noise processing or sharpness according to local information is applied.

The display 180 according to an embodiment of the present disclosure may also be applied to a bendable display forming a curved surface.

Also, the display device 100 according to an embodiment of the present disclosure may be applied to a stand-type device including a stand, a support, and a display 180.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device, a display;

a controller configured to:

apply a global contrast curve that adjusts a luminance of an entire region of an input image, generate a plurality of local contrast curves corresponding to each of a plurality of local areas based on a local information of each of the plurality of local areas included in the entire region, apply each local contrast curve to each local area, and adjust one or more of a noise processing intensity or a sharpness intensity of a local output image to which the local contrast curve is applied based on each local information; and a storage configured to store a lookup table indicating a correspondence between intensity of the local contrast curve and the noise processing intensity, wherein the controller is further configured to obtain the noise processing intensity corresponding to the intensity of the local contrast curve from the lookup table.

2. The display device of claim 1, wherein the local information is either the intensity of the local contrast curve or a local average picture level (APL) of the local area.

3. The display device of claim 2, wherein the lookup table indicates a correspondence between the intensity of the local contrast curve, the noise processing intensity, and the sharpness intensity, wherein the controller is further configured to obtain the noise processing intensity and the sharpness intensity corresponding to the intensity of the local contrast curve from the lookup table.

4. The display device of claim 1, wherein the controller extracts a local average picture level (APL) of each local area, and obtains the intensity of the local contrast curve based on the extracted local APL.

5. The display device of claim 1, wherein the noise processing intensity and the sharpness intensity are in inverse proportion to each other.

6. A driving method of a display device, the method comprising:

applying a global contrast curve that adjusts luminance of an entire region of an input image;

generating a plurality of local contrast curves corresponding to each of a plurality of local areas based on local information of each of the plurality of local areas included in the entire region;

applying each local contrast curve to each local area;

storing a lookup table representing a correspondence between an intensity of the local contrast curve and a noise processing intensity;

acquiring the noise processing intensity corresponding to the intensity of the local contrast curve from the lookup table; and adjusting at least one of the noise processing intensity and a sharpness intensity of a local output image to which the local contrast curve is applied based on each local information.

7. The Method of claim 6, wherein the local information is either the intensity of the local contrast curve or a local average picture level (APL) of the local area.

8. The Method of claim 7, wherein the lookup table represents a correspondence between the intensity of the local contrast curve and the sharpness intensity; and the method further comprises acquiring the sharpness intensity corresponding to the intensity of the local contrast curve from the lookup table.

9. The Method of claim 7, wherein the lookup table represents a correspondence between the intensity of the local contrast curve, the noise processing intensity, and the sharpness intensity, and the method further comprises acquiring the noise processing intensity and the sharpness intensity corresponding to the intensity of the local contrast curve from the lookup table.

10. The Method of claim 6, further comprising:

extracting a local average picture level (APL) of each local area; and acquiring the intensity of the local contrast curve based on the extracted local APL.

11. The Method of claim 6, wherein the noise processing intensity and the sharpness intensity are in inverse proportion to each other.

12. A display device, a display;

a controller configured to:

apply a global contrast curve that adjusts a luminance of an entire region of an input image, generate a plurality of local contrast curves corresponding to each of a plurality of local areas based on a local information of each of the plurality of local areas included in the entire region, apply each local contrast curve to each local area, and adjust one or more of a noise processing intensity or a sharpness intensity of a local output image to which the local contrast curve is applied based on each local information; and a storage configured to store a lookup table indicating a correspondence between intensity of the local contrast curve and the sharpness intensity, wherein the controller is further configured to obtain the sharpness intensity corresponding to the intensity of the local contrast curve from the lookup table.

* * * * *